Nov. 7, 1967  H. J. MUMMA  3,351,145
MACHINE FOR WEIGHING EGGS
Original Filed Dec. 28, 1953  14 Sheets-Sheet 9
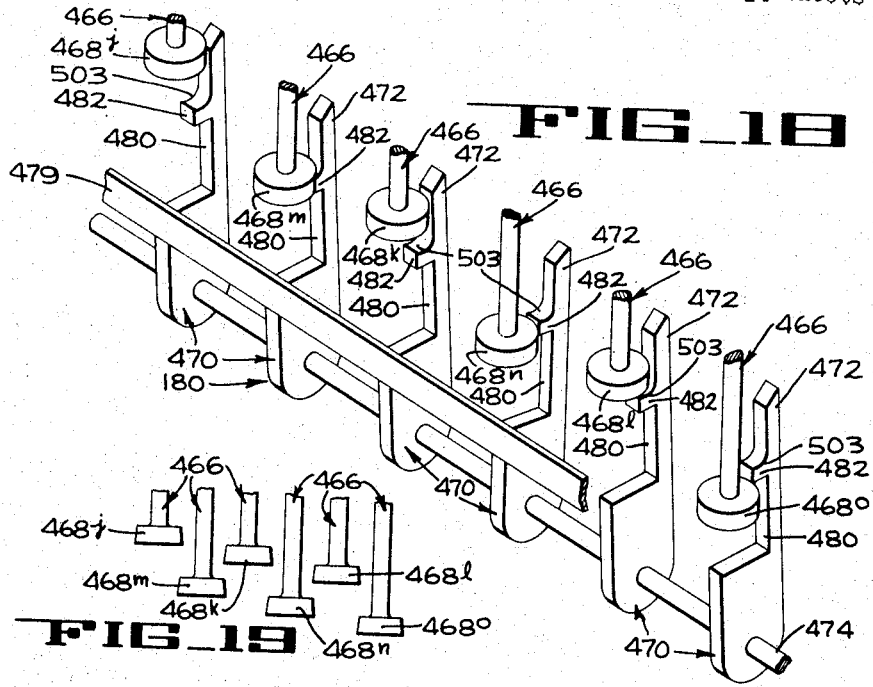
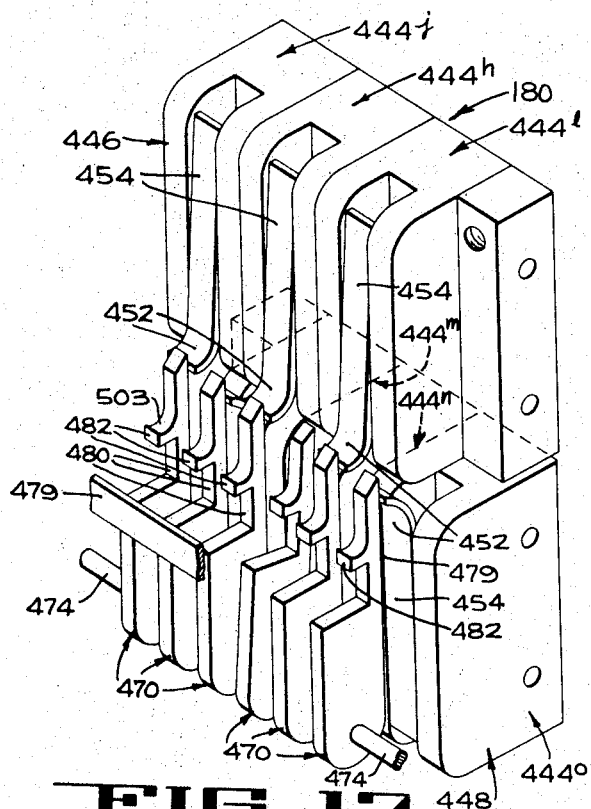
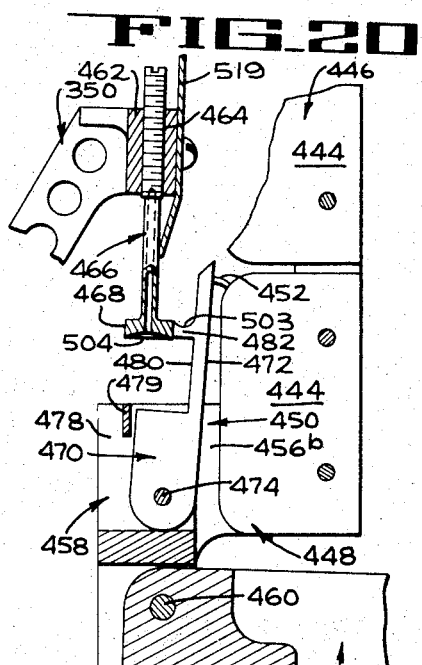
INVENTOR
HAROLD J. MUMMA
BY Francis W. Anderson
ATTORNEY

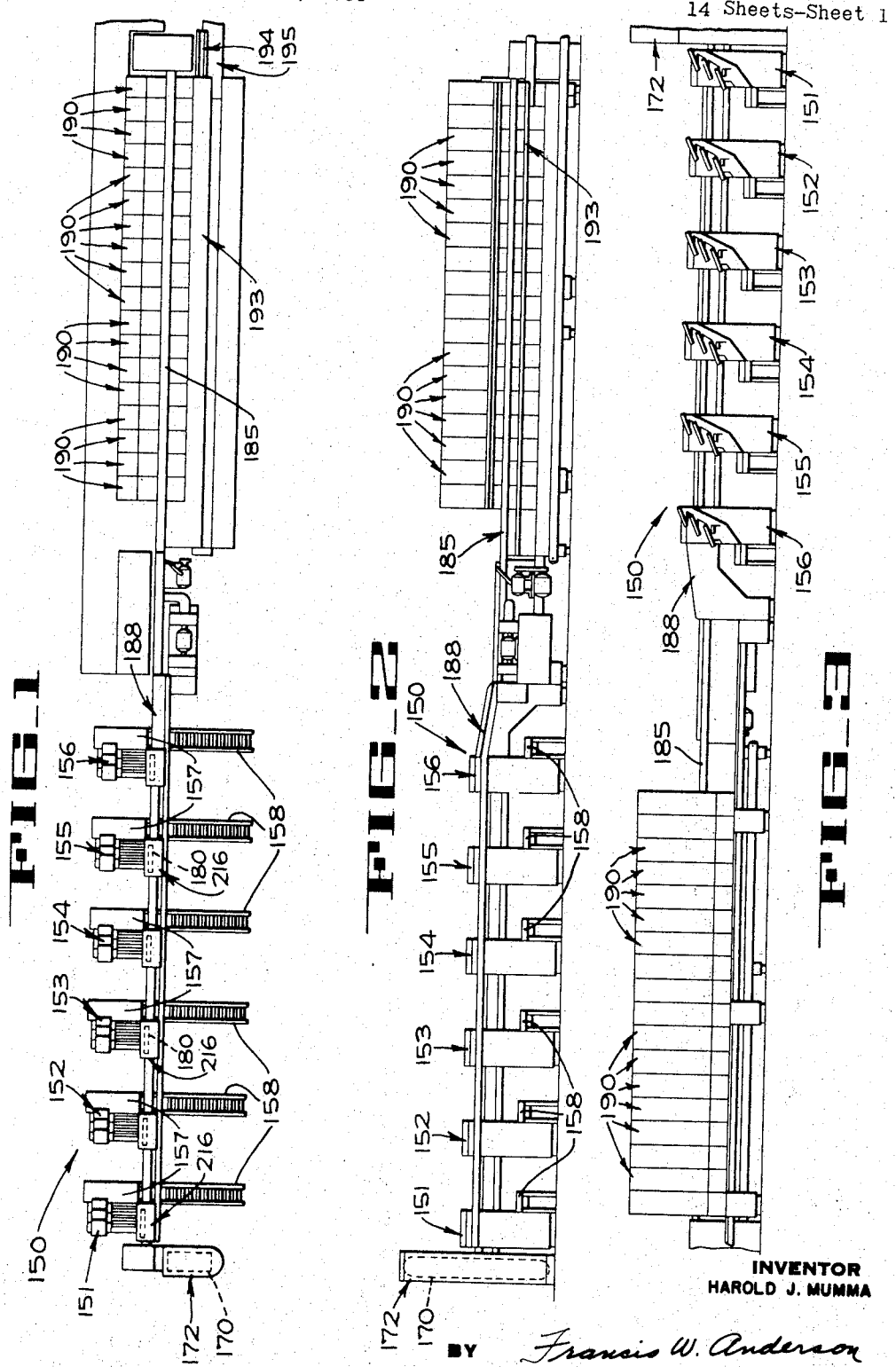

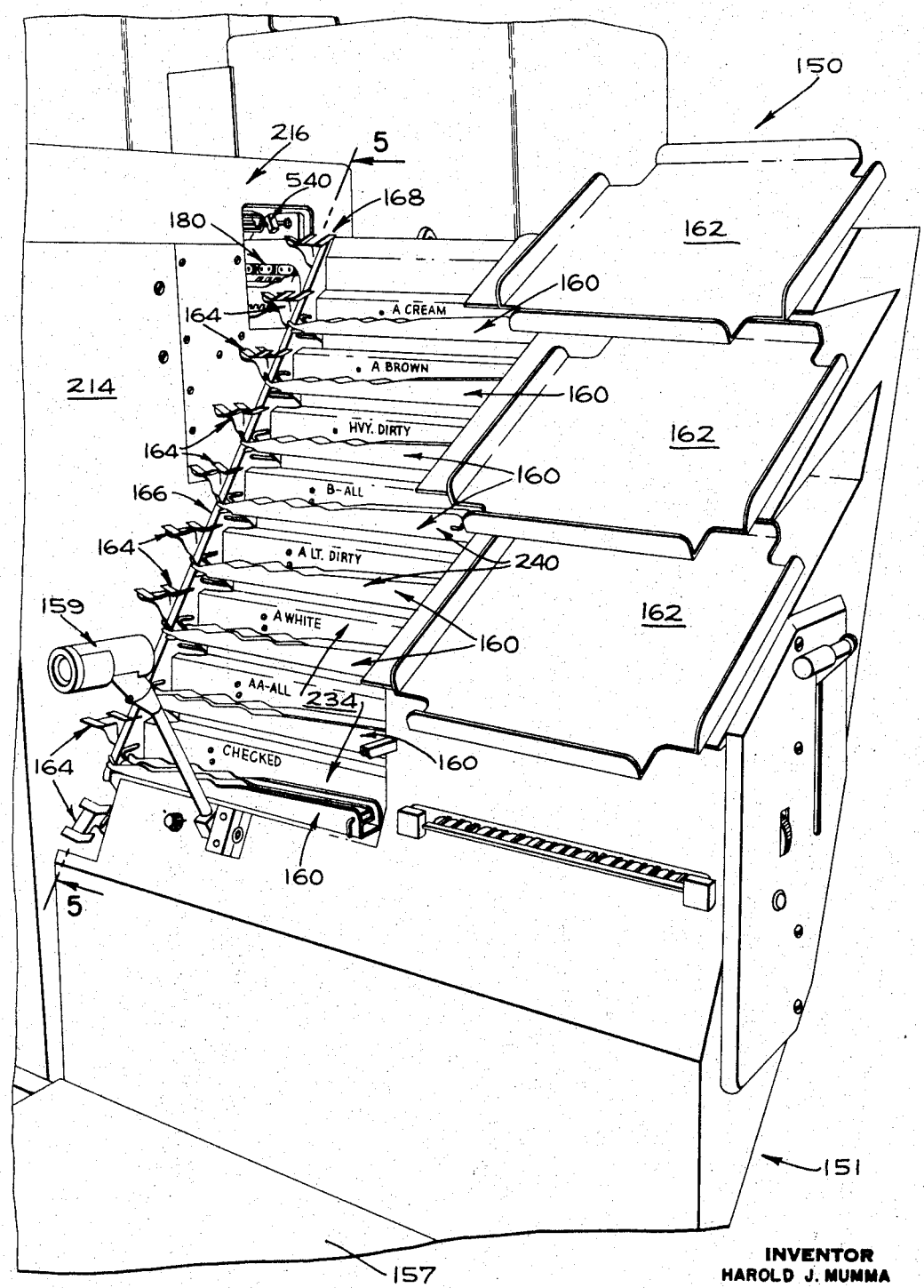

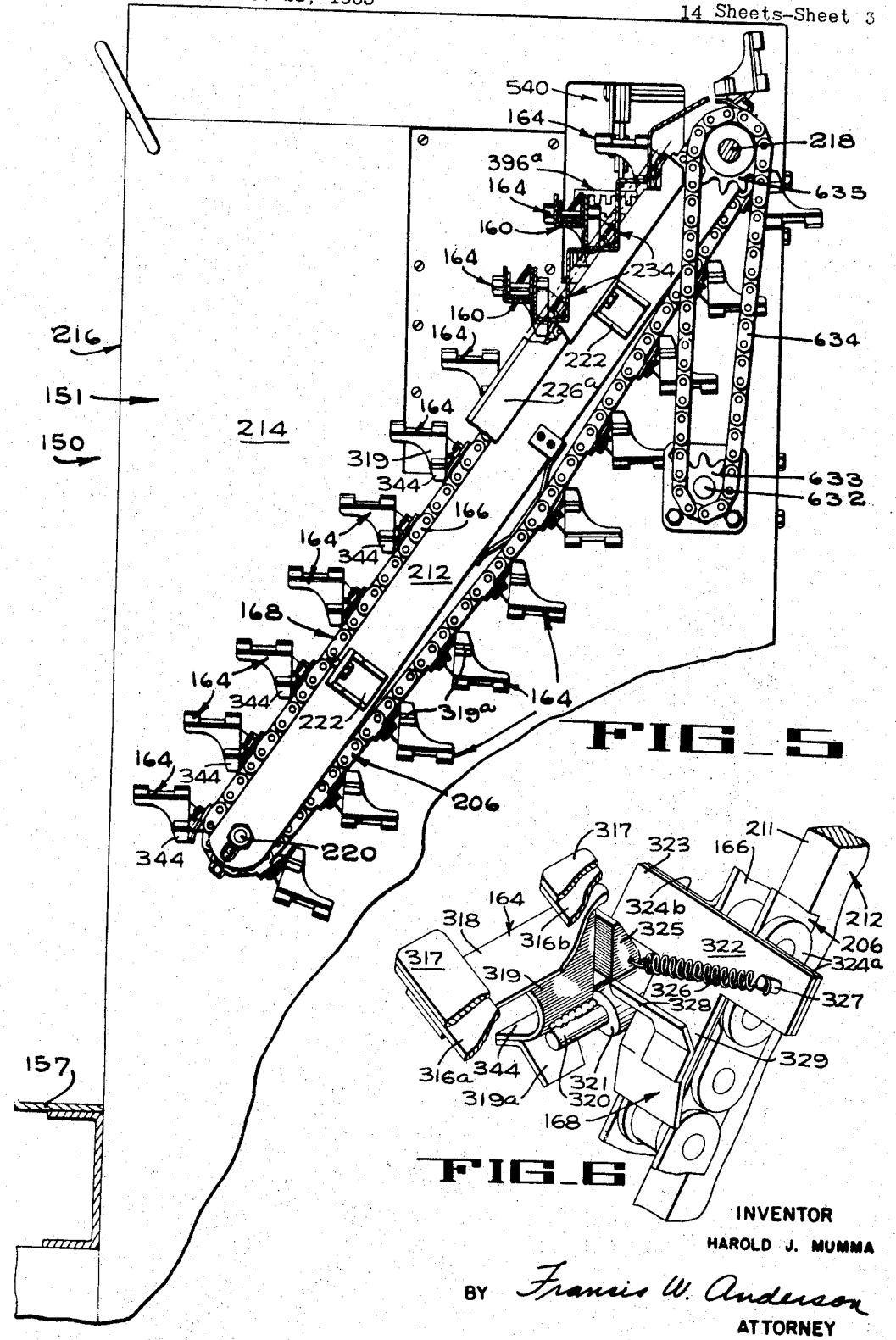

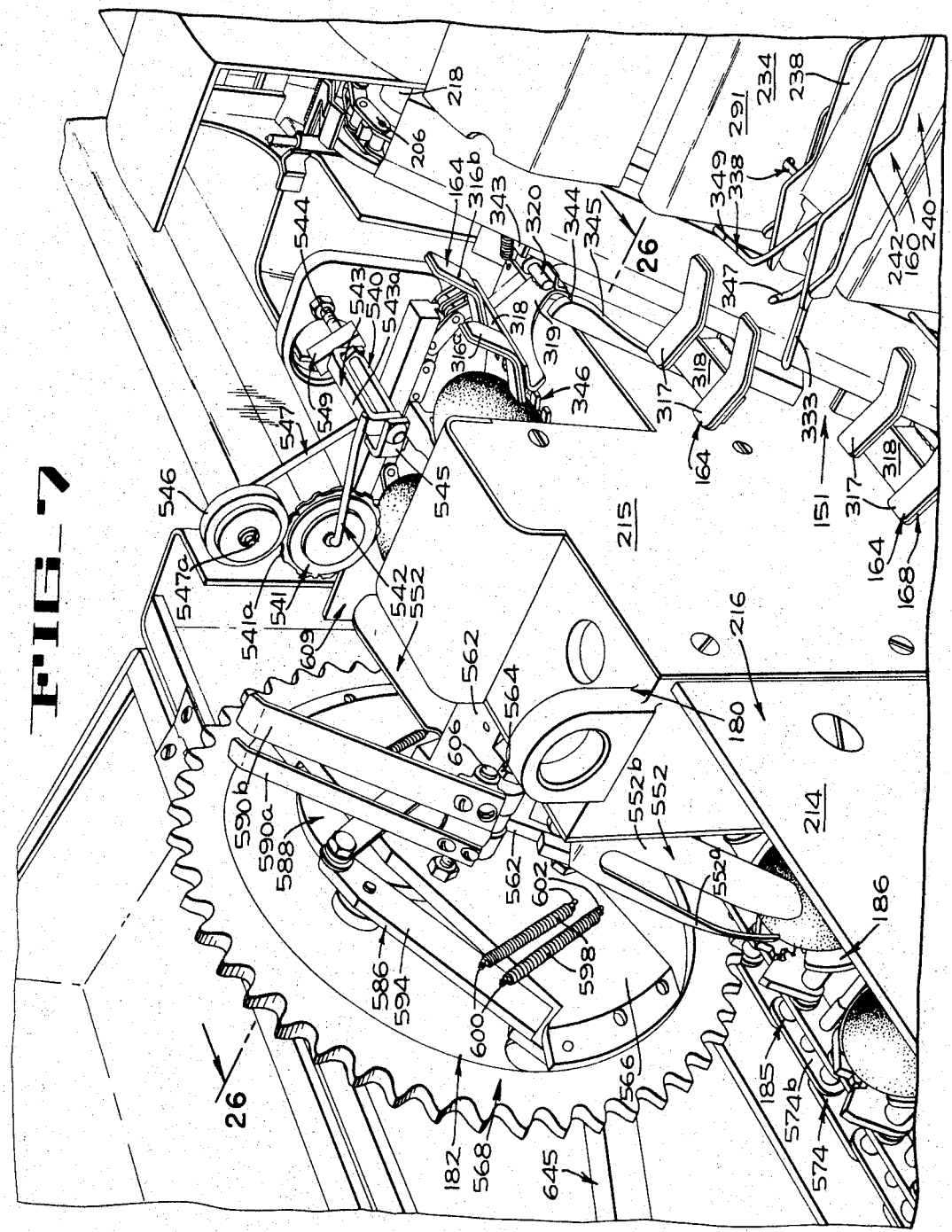

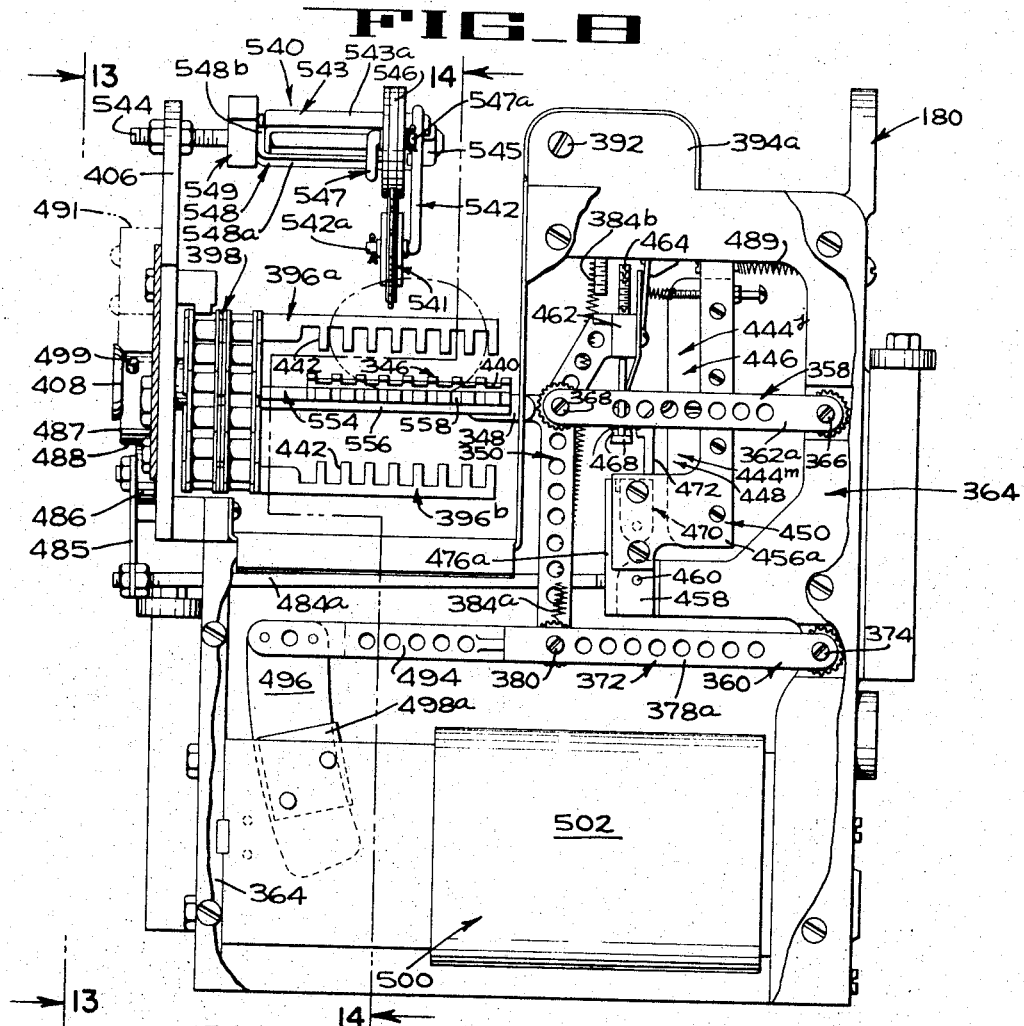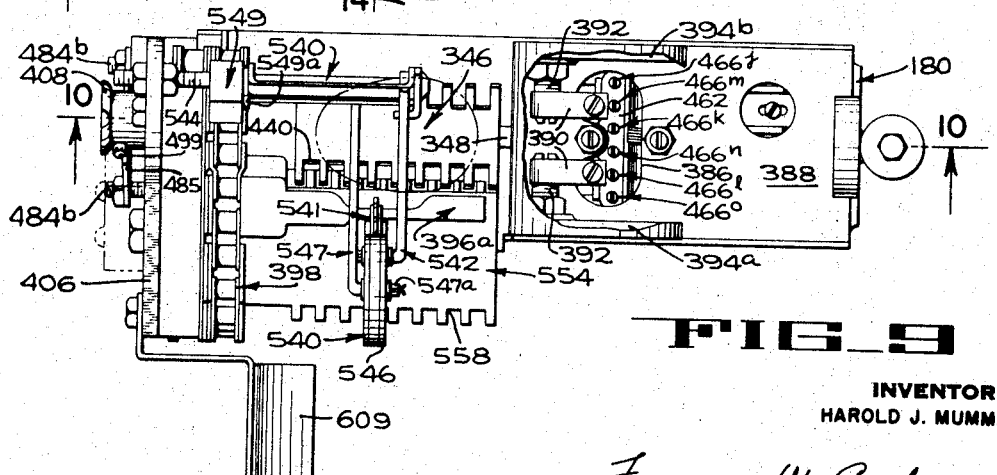

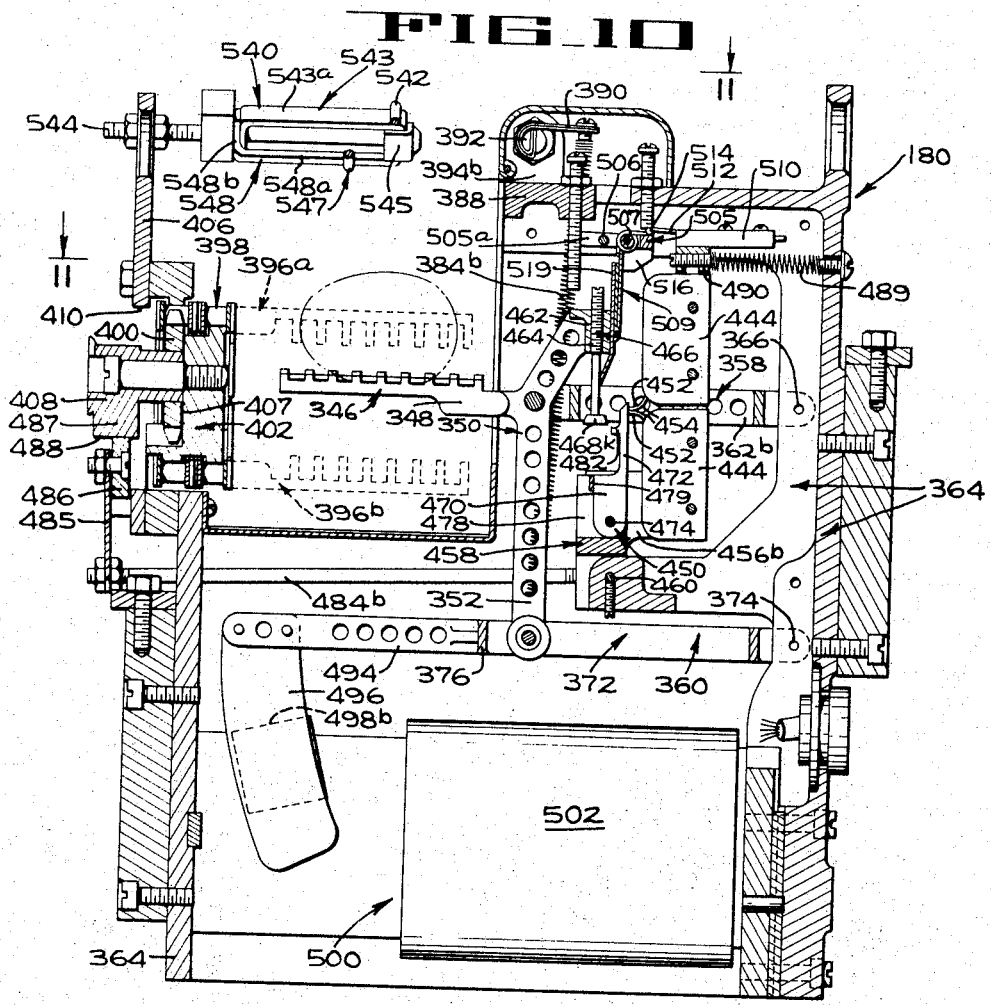
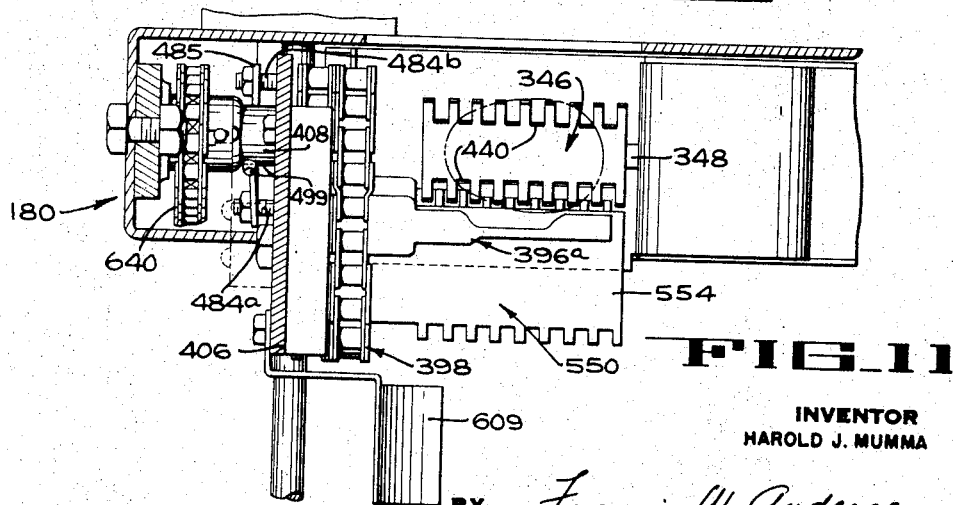

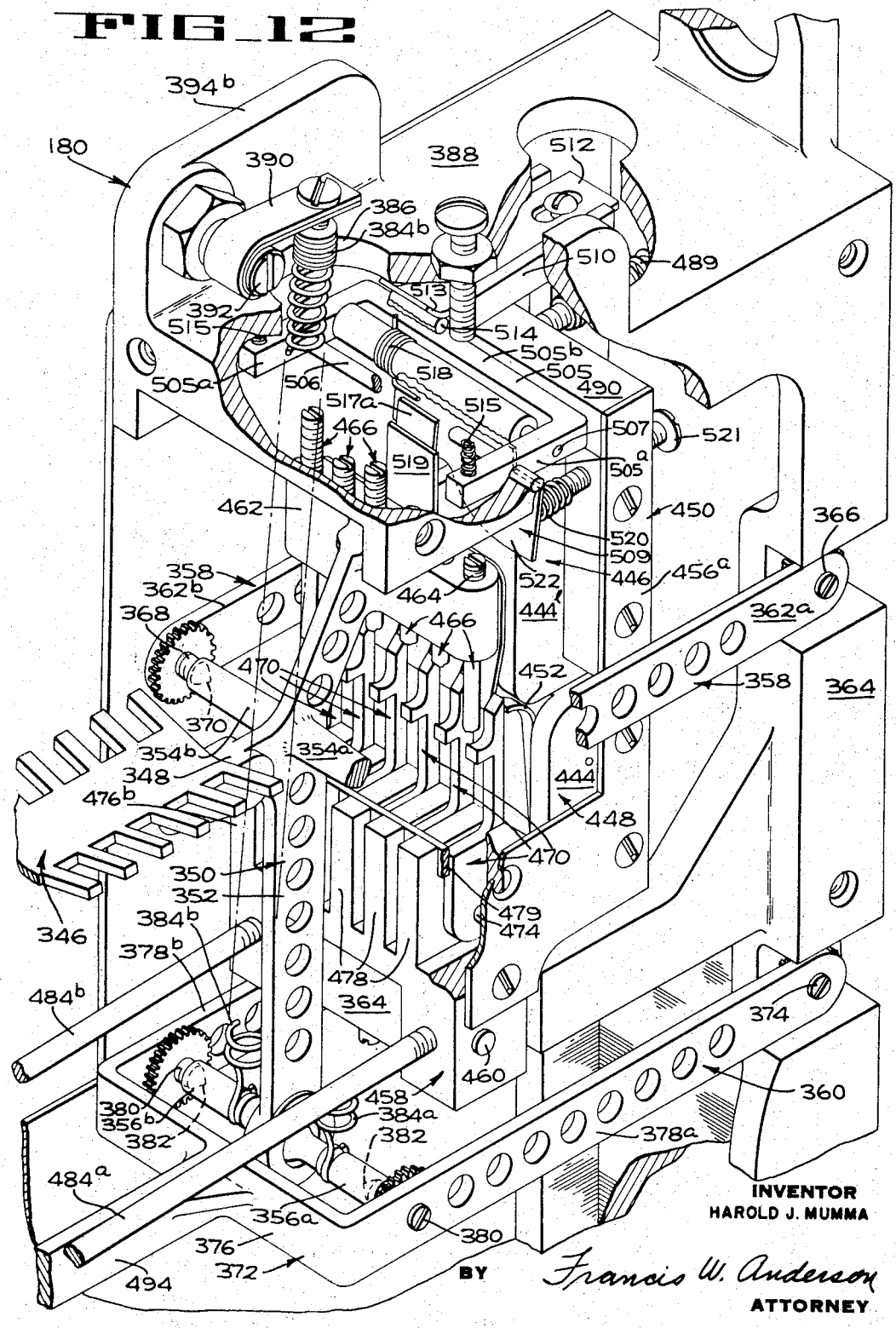

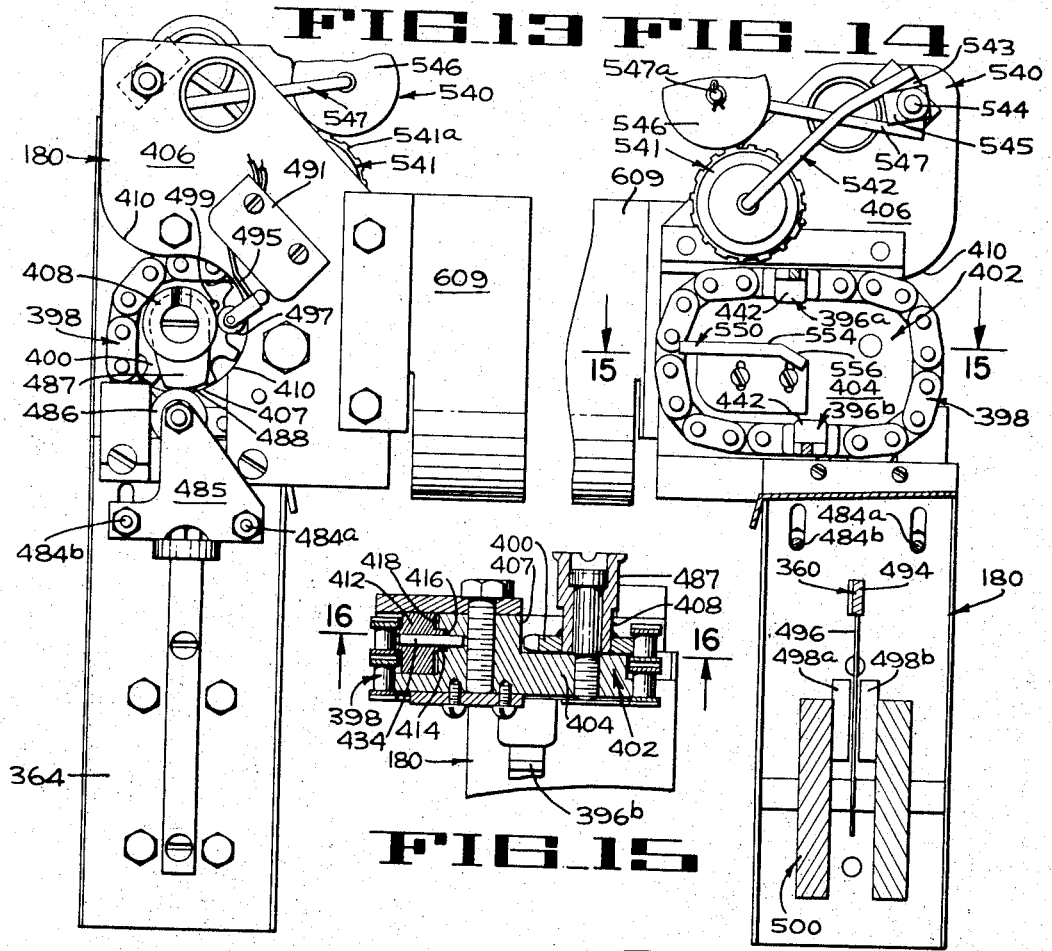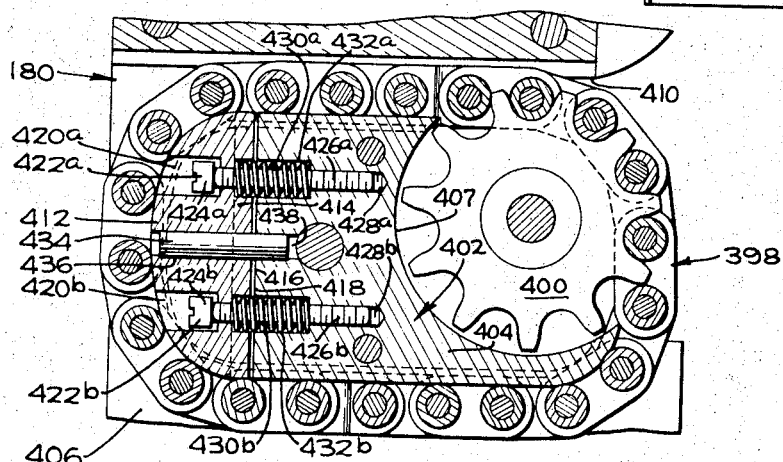

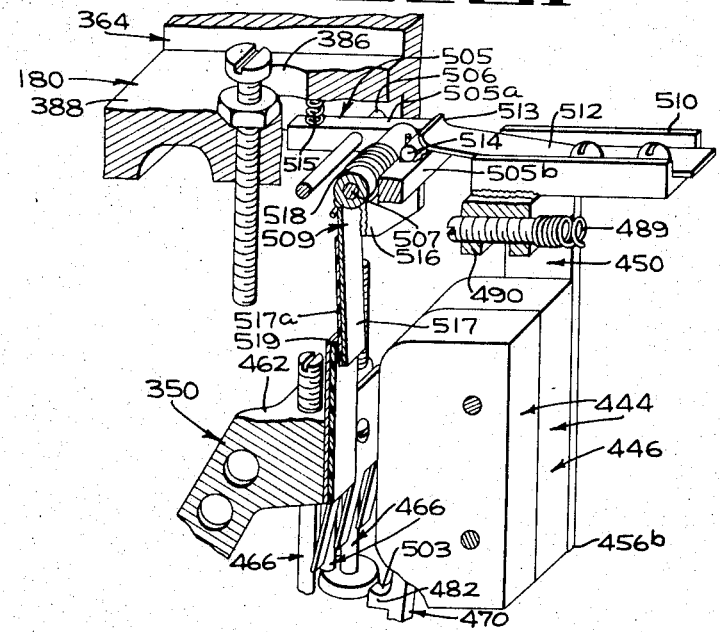
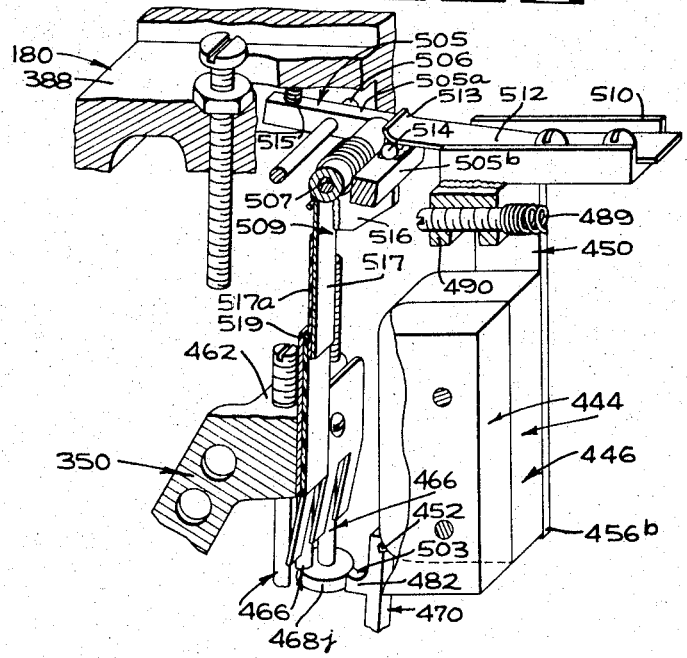

Nov. 7, 1967  H. J. MUMMA  3,351,145
MACHINE FOR WEIGHING EGGS
Original Filed Dec. 28, 1953  14 Sheets-Sheet 11
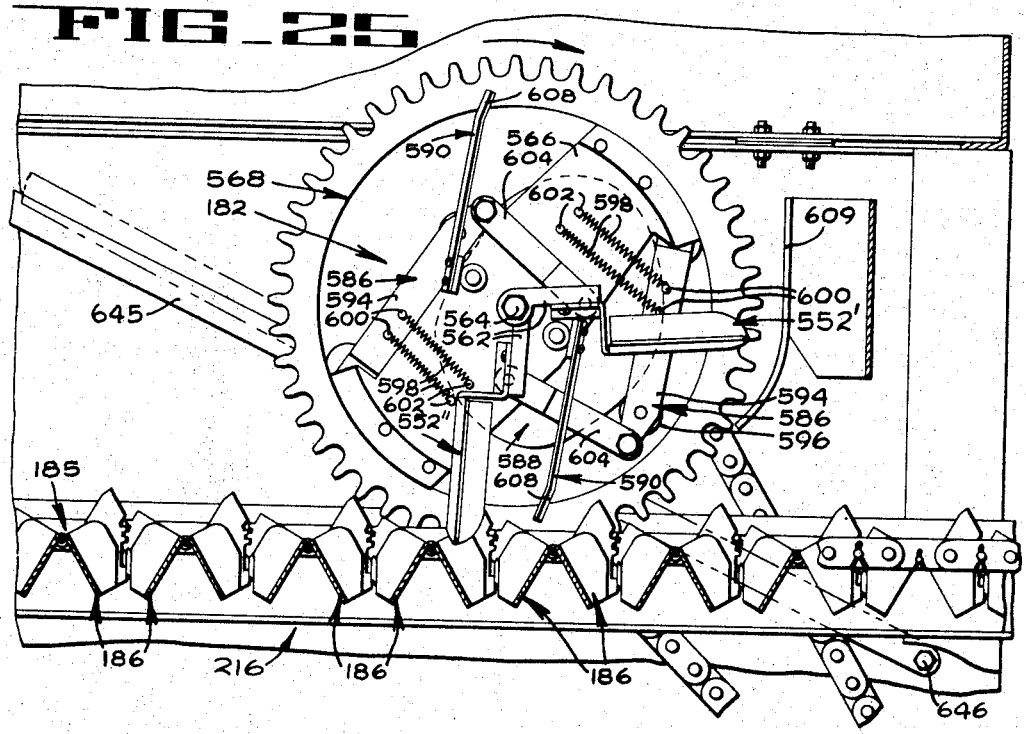
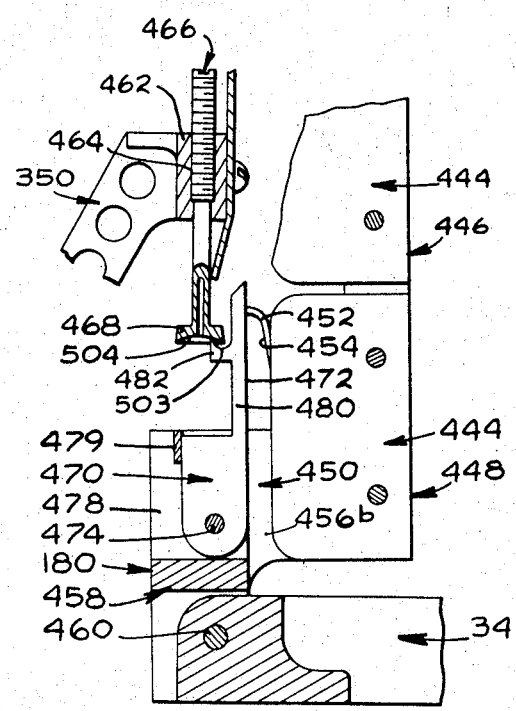
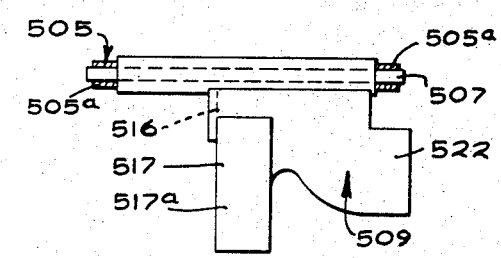
INVENTOR
HAROLD J. MUMMA
BY *Francis W. Anderson*
ATTORNEY

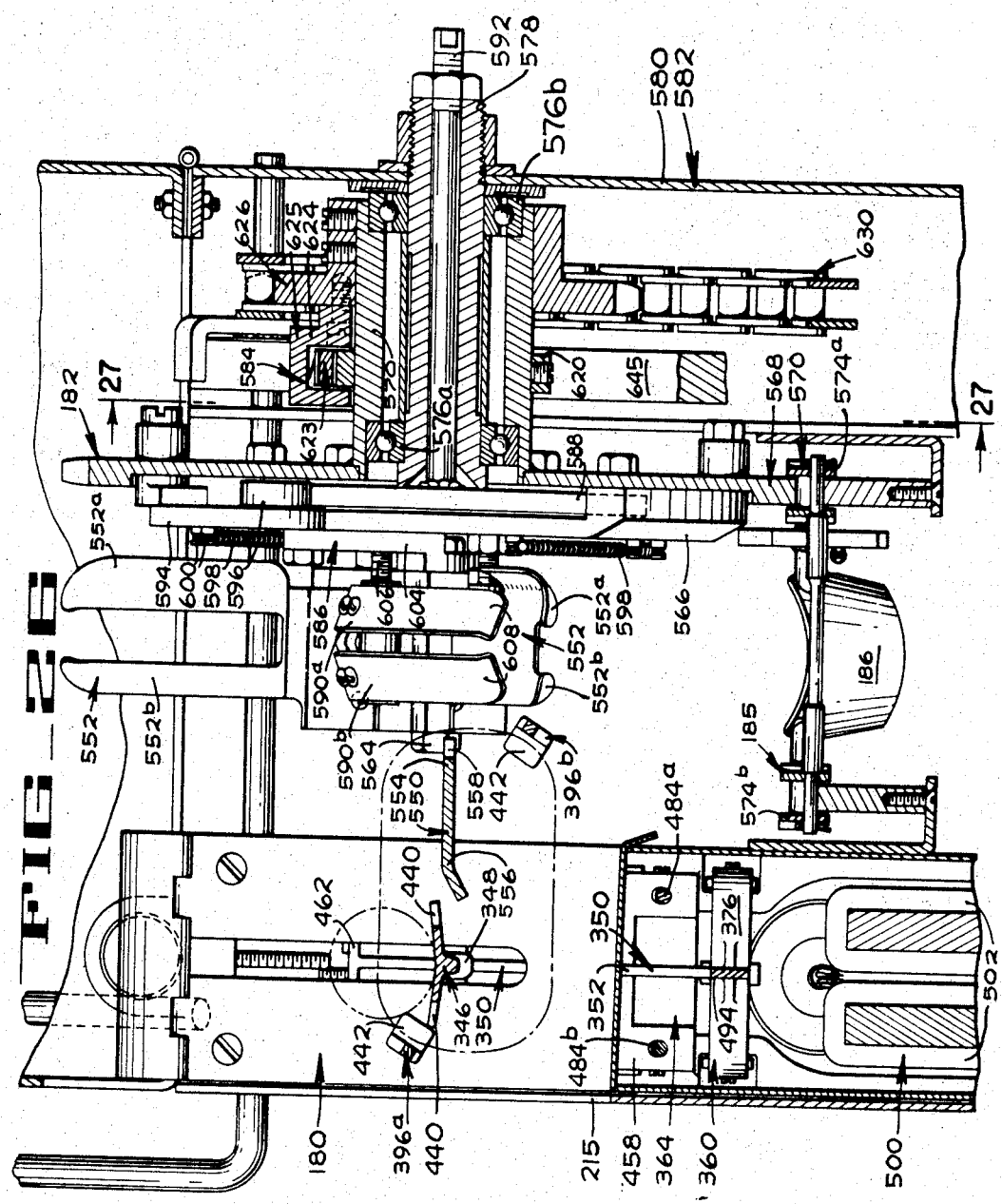

Nov. 7, 1967　　　H. J. MUMMA　　　3,351,145
MACHINE FOR WEIGHING EGGS
Original Filed Dec. 28, 1953　　　14 Sheets-Sheet 13
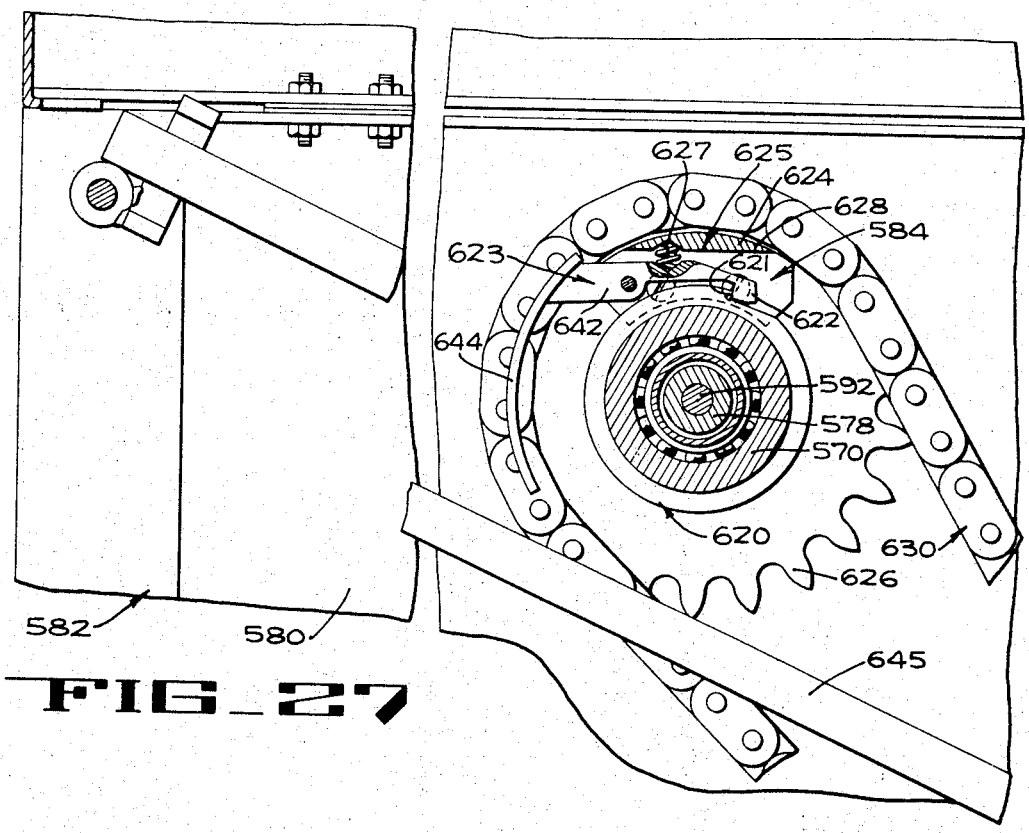
FIG_27
FIG_28
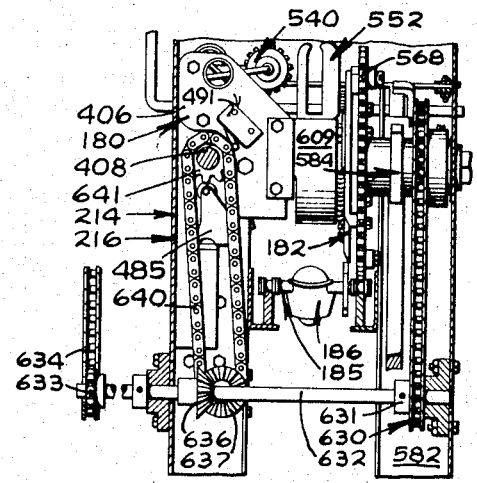
INVENTOR
HAROLD J. MUMMA
BY *Francis W. Anderson*
ATTORNEY

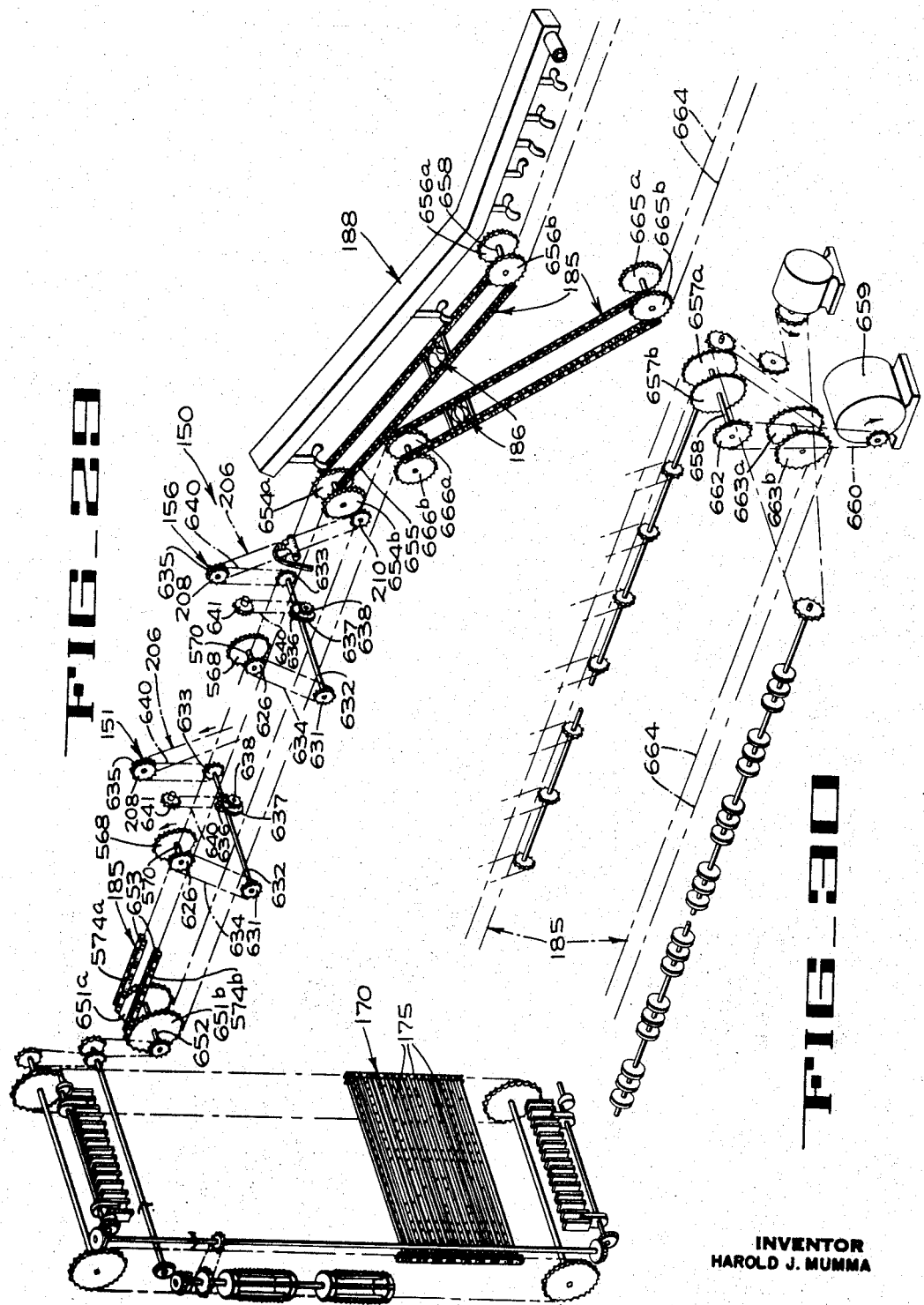

United States Patent Office 3,351,145
Patented Nov. 7, 1967

3,351,145
MACHINE FOR WEIGHING EGGS
Harold J. Mumma, Riverside, Calif., assignor to FMC Corporation, a corporation of Delaware
Application July 15, 1959, Ser. No. 827,256, now Patent No. 3,187,827, dated June 8, 1965, which is a division of application Ser. No. 400,466, Dec. 28, 1953. Divided and this application Dec. 16, 1963, Ser. No. 388,968
7 Claims. (Cl. 177—12)

The present application is a division of the application of Harold J. Mumma, Ser. No. 827,256, filed July 15, 1959, now Patent No. 3,187,827, issued June 8, 1965, which application was a division of the application of Harold J. Mumma, Ser. No. 400,466, filed Dec. 28, 1953, now Patent No. 2,895,274, issued July 21, 1959.

The present invention relates to machines for handling eggs, or the like and more particularly to an improved mechanism for weighing eggs as they are conveyed through an egg handling machine.

An object of the present invention is to provide improved egg handling equipment.

Another object is to provide a dependable and fast operating egg weighing mechanism.

These and other objects of the present invention will be apparent from the following description of the accompanying drawings which illustrate a preferred embodiment thereof and wherein:

FIG. 1 is a schematic plan view of the complete egg handling machine of the invention.

FIG. 2 is a schematic side elevation of the machine shown in FIG. 1.

FIG. 3 is a schematic side elevation of the same machine viewed from the side opposite to FIG. 2.

FIG. 4 is a perspective of one of the candling stations comprised in the machine of the invention.

FIG. 5 is a section through the feed elevator of the candling station illustrated in FIG. 4 taken along line 5—5 of said FIG. 4.

FIG. 6 is a fragmentary perspective of one of the egg supporting cups carried by the feed elevators of the machine.

FIG. 7 is a fragmentary perspective of the upper end of a feed elevator and of the adjacent egg weighing mechanism.

FIG. 8 is a fragmentary side elevation of the egg weighing mechanism associated with each candling station.

FIG. 9 is a fragmentary plan view of said egg weighing mchanism.

FIG. 10 is a vertical section through said egg weighing mechanism taken along line 10—10 of FIG. 9.

FIG. 11 is a horizontal section through said egg weighing mechanism taken along line 11—11 of FIG. 10.

FIG. 12 is an enlarged perspective of the egg weighing mechanism of the present invention.

FIG. 13 is an end elevation of the egg weighing mechanism viewed in the direction of arrows 13—13 shown in FIG 8.

FIG. 14 is a vertical transverse section through the egg weighing mechanism taken along line 14—14 of FIG. 8 and viewed in the direction opposite to FIG. 13.

FIG. 15 is a horizontal section taken along line 15—15 of FIG. 14 and illustrating the drive mechanism for transfer arms that convey eggs from the feed elevator to, and across, the weighing mechanism.

FIG. 16 is a vertical section through FIG. 15 taken along line 16—16 thereof.

FIG. 17 is a fragmentary perspective of six switches, comprised in each egg weighing mechanism, and of actuating mechanism therefor.

FIG. 18 is a fragmentary exploded perspective of the actuating mechanism for the switches illustrated in FIG. 17.

FIG. 19 is a fragmentary elevational view of component parts of said actuating mechanism.

FIGS. 20, 21, 22 and 23 are perspective detail views of component parts of the weighing mechanism, shown in different operational positions.

FIG. 24 is a detail view showing a part of the mechanism illustrated in FIGS. 21 and 22 as viewed from a point in front thereof.

FIG. 25 is a side elevational view of said egg lowering mechanism, with part of the distributing conveyor underneath shown in longitudinal vertical section.

FIG. 26 is a fragmentary section taken substantially along line 26—26 of FIG. 7 and illustrating part of the power train between the distributing conveyor and the feed elevator of the associated candling station.

FIG. 27 is a fragmentary vertical section taken along line 27—27 of FIG. 26 and illustrating an operational position of a clutch connected into the power train between the distributing conveyor and the feed elevator of each candling station.

FIG. 28 is another fragmentary section similar to FIG. 26 illustrating a subsequent portion of the power train between the distributing conveyor and the feed elevator of each candling station.

FIGS. 29 and 30 are the left and right halves of a fragmentary schematic perspective illustrating the mechanical power trains comprised in the machine of the invention.

Having reference first to FIGS. 1, 2 and 3, the embodiment of the invention illustrated in the accompanying drawings comprises six candling stations 150 individually identified by the reference numerals 151, 152, 153, 154, 155 and 156. Every one of said stations is provided with a platform 157 upon which the candler receives cases or crates with eggs from an inclined roller conveyor 158. At each of said stations, an operator examines the eggs for external appearance, views them against a torch 159 (FIG. 4) to determine their internal condition and places those found acceptable upon one of eight superposed racks or chutes of a storage unit 160, according to their individual quality, while depositing eggs that are broken, excessively dirty, or otherwise unfit for human consumption into cardboard containers (not shown) placed upon trays 162 that are supported in candelabrum fashion at the right end of the storage units 160.

At each candling station the eight superposed racks or chutes 160 are arranged to deliver eggs deposited thereinto onto cups 164 upon the rising run 166 (FIGS. 4 and 5) of an elevator conveyor 168, and whenever an egg passes from the end of the rack or chute 160 into a cup 164, it actuates mechanism that registers the quality of the egg as represented by the rack onto which it was deposited by the candler, upon a rotary control device 170 (FIG. 1) termed the memory belt that operates within a cabinet indicated at 172.

The memory belt 170 turns in timed relation with the elevator conveyors 168, and when an egg passes from one of the eight racks 160 of a candling station onto a cup 164 of the particular elevator associated with said candling station, the hereinbefore mentioned registration mechanism sets an element of the memory belt that corresponds to the particular elevator cup, in a manner indicative of the quality as represented by the chute or rack from which the egg was delivered onto the cup.

Each of the six elevators 168 is arranged to deliver the eggs it receives from its associated racks or chute 160 to a respective one of six weighing mechanisms identified by the reference numerals 180 (FIGS. 1 and 7) upon which the eggs are weighed and which is arranged to activate mechanism that registers the weight group to which a particular egg belongs in the same sector of the memory belt that previously recorded the quality of said egg.

From the weighing mechanism of the six candling stations the eggs are delivered by means of a lowering conveyor mechanism 182 (FIG. 7) onto a common single file conveyor 185 that carries an endless sequence of egg retaining buckets 186, and which operates at six times the speed of the elevators 168 and is timed in such a manner relative to said elevators and the associated weighing and egg lowering mechanisms that its consecutive buckets may carry away all eggs supplied from the six elevators by the egg lowering mechanisms 182 without danger that more than one egg may be deposited into one and the same bucket.

The conveyor 185 conducts the eggs through an oiling station 188 (FIGS. 1 and 2) wherein eggs of selected quality and weight combinations are subjected to an oil spray under control from the memory belt 170 to preserve their freshness. Thereafter said conveyor 185 extends over eighteen consecutive packing stations 190 (FIGS. 1 and 2) each provided with a container supply magazine (not shown), and as it carries the eggs consecutively to said packing stations, it distributes eggs of the same preselected weight and quality combinations under control from the memory belt 170 at predetermined ones of said stations into suitable cardboard containers delivered from the magazines into positions underneath the distributing conveyor, such that said containers will receive only eggs of the same preselected weight and quality group. After a cardboard container has been filled in the described manner with eggs of the same quality and weight group, it is discharged onto a take-off ramp 193 from where an attendant may transfer it onto a suitable take-off conveyor 194 or 195, depending on its size, while means enter into operation that deliver a fresh cardboard container from the magazine into egg receiving position below the distributing conveyor 185.

The construction and operation of each elevator conveyor 168 is described in detail in the above-mentioned Mumma parent application and, in general, comprises an endless sprocket chain 206 (FIG. 5) trained about an upper drive sprocket (not shown), that is keyed on a drive shaft 218, and a lower idler sprocket 210 with its rising run disposed in a reclining plane and supported upon the upper edge of a reclining plank 212 that is suitably supported from the adjacent wall 214 of a cabinet 216 which houses the hereinbefore mentioned weighing mechanism 180. The upper end of the plank 212 carries rotatably mounted therein the drive shaft 218, while the idler shaft 220 for sprocket 210 is suitably journalled in the lower end of said plank.

The cups 164 are provided along the circumference of the elevator chain 206 at intervals equal to the distances between consecutive ones of the superposed racks 160 and each cup comprises two bar-shaped supporting members 316a and 316b (FIG. 7) that are covered with rubber pads 317 and which extend transversely of the elevator chain and are spaced from each other in a direction longitudinally of said chain. Said members 316a and 316b are bent to form a shallow V so as to retain an egg deposited thereonto. At the side adjacent the hereinbefore mentioned cabinet 216 and remote from the ends of the racks 160, the members 316a and 316b are rigidly secured to, and connected by, a brace bar 318 (FIG. 6) that forms a downwardly directed stem or foot 319 which is rigidly secured to a pivot stud 320 that projects from and is rotatably carried by a tubular bearing 321. Said bearing in turn is firmly secured to the left inner corner of a T-shaped mounting plate 322 whose cross bar 323 is rigidly connected to two transversely aligned links 324a and 324b of the elevator conveyor chain 206. The stem 319 carries an ear 325, and a spring 326 tensioned between said ear and a stud 327 provided on the right end of the cross bar 323 yieldably holds said ear 325 against a stop lug 328 secured to the center bar 329 of the T-shaped mounting plate 322, and in this manner maintains the cup in the upright position illustrated in FIG. 6 when it travels along the rising run of the elevator 168.

As a cup 164 on the rising run of the elevator conveyor 168 reaches the summit of said run, a laterally turned ear 344 (FIG. 6) on the lower end of the supporting stem 319 of each cup comes against a camming ledge 345 (FIG. 7) suitably secured to the adjacent side wall 215 of the weighing mechanism 180. This is effective to swing the cup on its pivot 320 in counterclockwise direction as viewed in FIG. 7 against the urgency of the hereinbefore described spring 326. As a result thereof, any egg that may lie on the cup rolls or slides laterally onto an adjacently positioned platform 346 of the weighing mechanism 180. To insure return of a tilted cup 164 to its upright position after it has discharged an egg onto, and rises above the, weighing platform 346, a stationary lug 343 may be arranged to project into the path of an ear 319a (FIG. 6) that is secured to the bottom end of the stem 319 of each of the cups 163.

The platform 346 may be formed by a plate of shallow concavity about an axis extending in a vertical plane parallel to the vertical plane defined by the endless chain 206 of the elevator 168, and it is yieldably held at a predetermined upper level for downward movement in response to the deposit of an egg thereonto, in a manner maintaining its horizontal disposition during such downward movement. For this purpose the platform is fastened to the horizontal arm 348 of a bracket structure 350 (FIGS. 10 and 12) that has a vertically descending stem bar 352, and projecting laterally from the upper and lower end of said stem bar at either side thereof are shaft-like projections 354a, 354b and 356a, 356b that are rotatably supported from two superposed linkage parallelograms 358 and 360 (FIG. 8). The upper linkage parallelogram 358 is formed by two parallel arms 362a and 362b (FIG. 12) pivoted at their rear ends to the frame structure 364 of the weighing mechanism, as shown at 366. The front ends of said arms 362a and 362b carry suitable pivot bearings 368 whose inwardly directed points 370 engage cavities provided in the ends of the projections 354a and 354b, respectively. The lower parallelogram 360 is formed by a U-shaped bar 372 whose ends are pivotally supported from the frame structure 364 below the pivotal connections 366 of arms 362a and 362b, as shown at 374 in FIG. 12. Near the connecting leg 376 of the U-shaped bar 372 the parallel legs 378a and 378b thereof carry pivot bearings 380 whose inwardly directed points 382 engage cavities provided in the ends of the lower projections 356a and 356b, respectively, as likewise shown in FIG. 12. A pair of vertically disposed coil springs 384a and 384b hooked with their lower ends over the lower shaft-like projections 356a and 356b, respectively, of bracket 350 extend upwardly through a suitable aperture 386 in the roof portion 388 of the hereinbefore mentioned frame structure 364, and are supported at their upper ends from said roof portion to yieldably maintain the platform 346 in a predetermined elevated position from which it may be depressed to lower levels depending upon the weight of an egg deposited thereinto.

To compensate for the effects of temperature changes upon the accuracy of the weighing mechanism, the upper ends of the springs 384a and 384b may be secured to the ends of bimetallic strips 390 that are coiled around, and anchored in, studs 392 which project inwardly from lateral wings 394a and 394b, respectively, formed by the roof portion 388 of the frame structure 364. When there is a rise in temperature tending to soften the springs, the ends of said bimetallic strips 390 will bend upwardly so as to increase the tension of the springs, and when the temperature drops, tending to harden the springs, the ends of said strips will drop so as to relieve the tension of the springs.

To control the transfer of an egg from a tilted cup of elevator 168 onto the platform 346 of the weighing mechanism and to remove the egg from said platform without delay, as soon as the weighing mechanism has reached an equilibrium position representative of the weight of the egg, transfer arms 396a and 396b (FIG. 8) are arranged to rise through the space between the elevator 168 and the platform 346 ahead of an egg sliding from a tilted cup and to swing in a shallow arc over said platform. In this manner the arms 396a and 396b control the speed with which an egg may roll or slide from a tilted cup onto the platform 346, and clear any preceding egg from the platform at the appropriate moment when the mechanical phase of the weighing operation has been completed.

Having reference to FIGS. 8, 10 and 14, in the particular embodiment of an egg weighing mechanism illustrated in the accompanying drawings the transfer arms 396a and 396b are rigidly supported at diametrically opposite points of, and project laterally from, an endless sprocket chain 398 that is trained over a drive sprocket 400 and a combined chain guiding and tensioning structure 402 (FIG. 16). The sprocket chain guiding nad tensioning structure comprises a stationary segment 404 that is bolted to a vertically positioned mounting plate 406 which is rigidly supported from the frame structure 364 of the weighing mechanism in front of the platform 346, as best shown in FIGS. 8 and 10. The stationary segment 404 has an arcuate recess 407 within which is disposed the drive sprocket 400 (FIG. 16). Said drive sprocket is mounted upon a drive hub 408 whose axis runs parallel to the longitudinal center line of the platform 346 (FIG. 10) and which protrudes through a recess 410 in the mounting plate 406 and is rotatably supported in any suitable manner from the stationary segment 404 of the tensioning structure 402. The chain guiding and tensioning structure 402 comprises also another segment 412 that has a key ridge 414 which engages a corresponding key way 416 formed in the end face 418, of the stationary segment 404, remote from the sprocket 400 (FIGS. 15 and 16). Said second segment 412 is supported from the stationary segment 404 for limited movement relative thereto. For this purpose the arcuate chain guiding face of said second segment may be provided with a pair of recesses 420a and 420b within which are received the heads 422a and 422b of bolts 424a and 424b, respectively, that extend loosely through smooth apertures in the movable segment 412 and engage with their free threaded ends 426a and 426b correspondingly threaded apertures 428a and 428b provided in the hereinbefore mentioned end face 418 of the stationary segment. Springs 430a and 430b coiled about said bolts 424a and 424b, respectively, within the radially expanded outer portions 432a and 432b of the apertures 428a and 428b bear against the adjacent face of the movable segment 412 thus urging said segment 412 away from the stationary segment 404 to an extent limited by the adjustable position of the heads 422a and 422b of the screw bolts 424a and 424b, respectively. In this manner the sprocket chain trained over both said segments and the drive sprocket 400 is at all times maintained in properly tensioned condition. To avoid any shifting of the movable segment relative to the stationary segment in the direction of their inter-engaged key 414 and key way 416, respectively, a closely fitting guide pin 434 may be arranged to engage with its opposite ends axially aligned guide holes 436 and 438, respectively, provided in the confronting end walls of said segments, as best shown in FIG. 16.

To enable the transfer arms 396a and 396b to swing so closely over the platform 346 as to preclude the possibility of a small-sized egg being crushed between said arms and the platform, the edge of said platform which faces the elevator 168 is of digitate construction, as shown at 440 in FIGS. 8, 9, 10 and 11, and the inwardly directed faces of the transfer arms are correspondingly digitated so that the digits 442 of the latter may pass through the spaces between the digits 440 of the former, as illustrated in FIGS. 9 and 11.

For recording the result of the weighing operations, the weighing mechanism of the present invention comprises, for instance, six normally open switches 444 (FIG. 17) which correspond to six different weight ranges and which will be individually identified by the suffix letters j, k, l, m, n and o wherever necessary in the following description to enhance the understanding of the operation of the machine. Upon delivery of an egg onto the platform 346, means enter into operation that close a single one of said switches depending upon the level to which the platform has been depressed by the weight of the egg thereon. Each of the six switches 444 lies in the power circuit of, and is adapted upon closure to energize, a solenoid (not shown) that is located adjacent the hereinbefore mentioned memory belt 170, to activate a member on said belt that is representative of the weight of the egg which caused closure of the particular switch 444. The electric circuit for switches 444 and their associated solenoid is disclosed in detail in the above-mentioned parent Mumma application, Ser. No. 400,466.

Having reference to FIGS. 12 and 17, said switches 444 may be arranged in two superposed rows 446 and 448, each of which has three switches. All of the switches are suitably supported from and within a rectangular frame 450, with the three upper switches disposed in an inverted and laterally displaced position relative to the three switches in the lower row such that the outwardly arched ends 452 of the actuating arms 454 of all six switches 444 are practically in juxtaposed relation, with the arched actuating ends of the upper switch arms disposed only at a very slightly higher level than those of the lower switch arms, as best shown in FIGS. 10 and 17. At their lower ends the side bars 456a (FIG. 8) and 456b (FIG. 10) of the rectangular frame 450 are rigidly secured to a transverse block 458 which is rotatably mounted upon a transverse shaft 460 that is supported from the repeatedly mentioned frame structure 364.

To close the proper one of the switches 444 upon depression of the platform 346 by an egg delivered thereinto, the platform bracket 350 (FIG. 12) carries above and rearwardly of its upper projections 354a and 354b a crossbar 462 (FIG. 12) and received within six transversely equi-spaced, vertically extending, threaded apertures 464 (one only being shown in FIG. 2) in said crossbar 462 are six screw bolts 466 that are aligned with the actuating arms 454 of the six switches 444 in a direction transversely of the weighing mechanism. Each of said bolts 466 carries at its lower end an actuating disc 468. The discs 468 (FIG. 19) are individually identified by the suffix letters j, k, l, m, n, and o, respectively, corresponding to the switches 444 with which they cooperate, and they lie in six consecutively lower planes corresponding to six different elevational positions to which the platform 346 may be depressed by an egg delivered thereonto according to its weight. In the preferred embodiment of the invention illustrated in the accompanying drawings the discs 468 are arranged in two superposed staggered rows of each three consecutively lower discs, as best shown in FIG. 19, with the highest disc 468j in the upper row placed opposite the actuating arm of the left-most switch 444j of the upper row of switches 446, which switch represents the heaviest weight range, and the highest disc 468m of the lower stagger disposed at a level below the lowest disc 468l of the upper stagger and opposite the actuating arm of the left-most switch 444m of the lower row of switches, which switch represents the "Medium" weight range. The lowest disc 468o of the lower stagger is disposed opposite the right-most switch 444o of the lower row of switches, which switch represents the lightest weight range that is usually termed "Pee Wee."

Interposed between each disc 468 and the actuating arm of its respective switch is a sensing finger 470 whose flat back edge 472 bears against the arched end 452 of its switch arm (FIG. 17), and all the sensing fingers 470 comprised in the mechanism are rotatably supported at their lower ends upon a common transverse spindle 474 (FIG. 18) whose opposite ends are mounted in laterally positioned upwardly extending projections 476a and 476b of the hereinbefore mentioned block 458 (FIG. 12), with suitable spacer partitions 478 formed by and projecting upwardly from said block 458 to maintain the sensing fingers 470 in their proper positions in alignment with their respective switch arms 454. A transverse stop bar 479 may be countersunk in the lateral projections 476a and 476b and the spacer partitions 478 in front of the sensing fingers 470 near their lower ends but above the level of spindle 474, as best shown in FIGS. 10 and 12, to limit forward movement of said fingers upon said spindle 474. The front edges 480 of the sensing fingers 470 form sensing noses 482 that lie in a common horizontal plane disposed a limited distance below the level of the lowest disc 468a when the weighing mechanism is in its idle position, i.e., with no egg deposited upon the platform 346.

Means are provided in accordance with the invention that move the frame 450 with the switches 444 and the sensing fingers 470 towards the discs 468 as soon as an egg has been delivered onto the platform 346 and said platform has come to rest in a depressed equilibrium position representative of the weight of the egg placed thereon which places one of the six discs 468 at about the same level as the sensing noses on fingers 470. For this purpose two substantially horizontal rods 484a and 484b (FIG. 12) are secured to and project forwardly from the transverse block 458 at either side of the stem 352 of bracket 350. At their free ends said rods carry a triangular plate 485 (FIGS. 10 and 13) and pivoted to the crest of said plate is a roller 486 that engages the edge of a cam 487 which is formed by the hereinbefore mentioned drive hub 408 of the sprocket 400 that operates the chain 398 of the transfer arms 396a and 396b. Whenever an egg has moved onto the platform 346 under control of one of the transfer arms and is about to be removed from said platform, the cam 487 presents a rise 488 in its contour to the roller 486 which depresses the free ends of the rods 484a and 484b and in this manner swings the frame 450 upon shaft 460 in a counterclockwise direction, as viewed in FIG. 10, against the urgency of a restore spring 489 that is tensioned between the top bar 490 of the rectangular frame 450 and the frame structure 364. As a result thereof, one of the horizontally aligned sensing noses 482 of the fingers 470 comes against its respective disc 468 depending upon the degree to which the bracket 350 was depressed by the weight of an egg placed upon the platform, and as the frame 450 continues to swing in counterclockwise direction under the force of the control cam 487, the finger 470 whose nose came against its respective disc 468 is swung backwards upon its spindle 474 relative to the other finger whose sensing noses move above or below their respective discs, as the case may be, and also relative to the switches 444 supported within the frame 450. As a result thereof the rear edge 472 of said finger 470 bears against the arched end 452 of the actuating arm 454 of its respective switch 444 and said switch is closed.

It will be understood that the vertical space between consecutive discs 468 must be less than the vertical thickness of the sensing noses 482 on fingers 470, to avoid that upon relative approach of the weighing bracket 350 and the switch supporting frame 450 all the sensing noses might move above or below their corresponding discs 468 which would fail to close any of the switches 444 and hence permit an egg to pass through the weighing mechanism without registering its weight upon the memory belt. On the other hand, it will also be understood that by spacing consecutive discs 468 from each other by a distance less than the vertical thickness of the sensing noses 482, there arises the danger that two adjacent ones of said noses might simultaneously be engaged by their co-acting discs, and two different weights might thus be registered on the memory belt if an egg should happen to be of a weight on the borderline between the weight ranges represented by two adjacent discs. To avoid any such double registrations, all the weight switches 444 are connected in series in such a manner that each switch which represents a higher weight range, when in open position, lies in and forms part of the power circuit of the weight recording solenoid that represents the next lower weight range. Hence, whenever two adjacent sensing noses 482 are engaged by their corresponding discs 468 during relative approach of the bracket 350 and the switch supporting frame 450, closure of the switch 444 that represents a higher weight range, while energizing its respective weight registering solenoid 445, will interrupt the power circuit of the solenoid 445 representing the lower next weight range and thus prevent energization of said solenoid, though the control switch 444 of said last mentioned solenoid may actually be closed. Consequently, there will be only one registration for an egg on the borderline between two consecutive weight ranges.

Still another source of misoperation of the described weighing mechanism is the fact that upon engagement of the sensing noses 482 by their respective weight discs 468 the actuating fingers 470 yield backwards upon the spindle 474 as the switch supporting frame 450 swings closer to the stationary disc-supporting bracket 350. The rotative movement of a finger 470 engaged by a disc 468 causes its nose 482 to descend to a slightly lower level. Thus, in the case where the sensing nose of an actuating finger was barely engaged by a disc that dropped only to the level of the upper edge of said sensing nose under the weight of an egg on the platform 346, it may happen, as an actuating finger 470 is pressed backwards and actuates its switch 444, that its nose drops below and thus becomes disengaged from the actuating disc causing the particular switch 444 to be reopened before the weighing operation is completed. This is liable to cause a double weight registration upon the memory belt because when said weight switch is opened, it interrupts no longer the power circuit of the weight recording solenoid 445 corresponding to the lower-next weight range, and if the control switch 444 of said lower weight range solenoid should happen to be closed by engagement of the sensing nose of its respective actuating finger 470 with its disc 468, said solenoid will be energized as soon as the sensing nose of the actuating finger of the first mentioned weight switch becomes disengaged from its disc. To prevent such misoperations, means are provided, to be described in greater detail hereinafter, that drop all the discs 468 to a somewhat lower level from the position shown in FIG. 21 to the position shown in FIG. 22 directly after the leading edges of the sensing noses 482 move into the plane determined by the foremost points of the circumferential edges of the weight discs. This moves a disc 468 that might otherwise barely engage the upper edge of its co-acting sensing nose 482 fully into a lasting cooperative relationship with said nose, which cannot be disengaged by the subsequent descent of the nose to a slightly lower level resulting from the rotary movement of its finger 470 upon the spindle 474. To avoid that the described downward movement of the discs 468 may cause the disc representative of the next higher weight range to bear against the sensing nose of its associated switch actuating finger, the upper edge of each sensing nose is of concave conformation as shown at 503 in FIGS. 20 and 23, and the under side of each weight disc 468 is of conically concave conformation as shown at 504 in said FIGS. 20 and 23. Hence, the described depression of the weight discs 468 will remain without effect upon the relationship of a weight disc to a sensing nose that it did not previously engage because, when said depression occurs, the edge of the weight disc will move into the concave upper edge 503 of the sensing nose, and the point of the sensing nose will engage the concave recess 504 in the bottom face of the disc.

As an added safeguard against double weight registrations resulting from successive energization of two weight recording solenoids, a normally open switch 491 is connected in series with all the six weight recording switches 444 and their respective solenoids and the described counterclockwise movement of the switch supporting structure is arranged to close said switch 491 for a very brief moment only. Thus, it is only during this very brief moment that any of said recording solenoids can be energized no matter what the position of their respective control switches 444 may be. In the embodiment of the invention illustrated in the accompanying drawings, the switch 491 may be mounted upon the hereinbefore mentioned mounting plate 406 of the weighing mechanism and have an actuating arm 495 provided with a roller 497 that is cyclically engaged by a bead 499 formed on the previously described hub 408 of the sprocket 400 which forms the cam 487 that controls the relative approach of the weight switches 444 and the switch actuating discs 468. The rotary position of said bead 499 on the hub 408 relative to the rise 488 on cam 487 is so chosen that said bead will engage the roller 497 and close the switch 491 whenever the rise of the cam 487 has fully depressed the lever rods 484a and 484b and effected closest approach of the weight switches 444 and their actuating discs 468 (FIG. 13).

Since the machine of the invention is intended to operate without interruption in the steady advance of an egg from the feed elevator to the packing mechanisms, the hereinbefore described weighing mechanism must be capable of weighing the eggs in rapid succession as they are passed from the elevator onto the weighing platform and from the weighing platform onto the distributing conveyor. To reduce the time interval required for the actual weighing operation without sacrifice in the dependability of results, means are provided in accordance with the invention that rapidly dampen the oscillations of the platform caused by delivery of an egg thereinto. For this purpose the crossbar 376 of the lower linkage parallelogram 360 carries a forwardly directed arm 494 (FIGS. 8 and 10) and secured to the front end of said arm is a plate 496 of electrically conductive material which is preferably of arcuate shape. Said plate extends into the space between the poles 498a and 498b of an electromagnet 500 of horseshoe shape (FIG. 14) that is supported from the frame structure 364 below the actual weighing mechanism and whose magnetizing winding is indicated at 502 in FIGS. 8 and 10. The magnetic field established between the poles of magnet 500 opposes movement of any electrically conductive member in a direction transversely to its force lines, and in this manner oscillations of the platform 346 and its supporting structure are quickly brought to a halt. Immediately thereafter the frame 450 with the switches 444 and their actuating fingers 470 is moved toward the discs 468 in the manner described above to cause closure of whatever switch 444 has its weight disc 468 aligned with the sensing nose 482 of its actuating finger, and in order that an egg deposited upon the platform 346 need not remain on said platform until the described disc-sensing and weight-switch-closing operation has been completed, and may be removed as soon as the oscillations of the platform 346 have come to a halt, means enter into operation coincident with the relative approach of the switches 444 and the discs 468 that operate first to slightly depress all the weight discs 468 so as to insure, in the manner described hereinbefore, lasting engagement, with its respective sensing nose, of the weight disc 468 that assumed a position about level with its sensing nose and, thereafter, to lock the disc supporting bracket 350 in its depressed position until the hereinbefore described switch closing operation has been completed.

The means for effecting the described operations comprise a U-shaped bracket 505 pivotally supported by a spindle 506 at intermediate points of its parallel shanks 505a from the ceiling portion 388 of the frame structure 364 of the weighing mechanism, as best shown in FIG. 12. Rotatably supported from a crossbar 507 held in said shanks at points between the spindle 506 and the center bar 505b of said bracket 505 is an apron of resilient material such as steel, whose conformation is specifically illustrated in FIG. 24. Upon movement of the switch supporting frame 450 toward the disc supporting bracket 350 a coil spring 520 (FIG. 12) wound around, and anchored in, a screw bolt 521 that is adjustably supported from the side bar 456a of frame 450 comes against a laterally projecting segment 522 of the apron 509 and forces a downwardly directed segment 517 of said apron, covered with a friction material 517a, against a plate 519 that is secured to the face of the crossbar 462 within which are held the stems 466 of the weight discs 468. Mounted in a substantially horizontally depressed channel section 510, and secured to the top bar 490 of the switch supporting frame 450 is a spring bar 512 which extends toward the center bar 505b of the U-shaped bracket 505 and forms an upwardly arched camming end 513. Upon further movement of the switch supporting frame 450 toward the disc supporting bracket 350, said arched end 513 engages a contact ledge formed by a pin 514 that is welded to the upper face of the center bar 505b of the bracket 505, depressing said bracket in clockwise direction from the position illustrated in FIG. 21 to the position illustrated in FIG. 22, against the urgency of restore springs 515 that are interposed between the free ends of the bracket shanks 505a and the ceiling portion 388 of the frame structure 364. The frictional engagement previously established between the apron segment 517 and the plate 519 forces the disc supporting bracket 350 to participate in the limited downward movement of the apron 509, which results from the described clockwise rotation of its supporting bracket 505 on spindle 506. Thus, the discs 468 drop to a slightly lower level which may effect full engagement of one particular disc with its sensing nose, as explained hereinbefore and as illustrated in FIG. 22. Upon further rotation of the switch supporting frame 450 toward the bracket 350 to effect actuation of whatever weight recording switch has the sensing nose of its actuating finger engaged by a weight disc, continued pressure of the coil spring 520 against the apron 509 and hence of apron segment 517 against plate 519 maintains the disc supporting bracket 350 dependably at said lower level until the switch closing operation has been completed. Consequently, the egg on the platform 346 may be removed from said platform very shortly after it has been deposited thereonto, and the described actuation of the proper weight recording switch 444 occurs actually as the egg is in the process of being transferred from the platform onto the distributing conveyor, and while another egg from the feed elevator may be delivered to the weighing mechanism. To insure disengagement of the apron 509 from plate 519 upon completion of the switch closing operation and to prevent interference of said apron with the supporting structure of the weighing platform, a spring 518 is arranged to urge the apron 509 in counterclockwise direction, as viewed in FIGS. 21 and 22, to an extent limited by contact of a stop lug 516 secured to said apron with the center bar 505b of the U-shaped bracket 505.

As previously pointed out, the particular embodiment of the egg weighing mechanism illustrated in the accompanying drawings comprises six discs 468 disposed at consecutively lower relative levels each adapted to be engaged by a respective one of the sensing noses 482 of the six switch actuating fingers 470, all of which noses are arranged in a common horizontal plane disposed at a lower level than the level of the lowest disc when there is no egg on platform 346. When a small egg is placed upon the platform, said platform and its supporting bracket 350 are depressed to a limited extent only, which may move the lowest of the discs 468, i.e. the rightmost disc 468o as viewed in FIGS. 18 and 19, to about the level of the sensing noses 482. Hence, only the switch 444o opposite said lowermost disc, i.e., the right-most switch of the lower row of switches 448 is closed upon movement of frame 450 toward the bracket 350, while all other discs are located above their cooperating sensing noses and are, therefore, unable to close their respective switches. Said right-most switch is arranged, upon closure, to actuate a solenoid placed in such relation to the hereinbefore mentioned memory belt 170 as to shift a member thereof from neutral to active position that is representative of the smallest weight range provided for in the machine of the invention. If a heavier egg is placed upon the platform 346, the platform bracket 350 is depressed to a somewhat lower level which may, for instance place the center disc 468n of the lower stagger of discs on a common level with the sensing noses of the fingers 470. Therefore, upon relative approach of the discs and the sensing fingers the center switch 444n of the lower row of switches is actuated, as illustrated in FIGS. 17 and 18. Said switch is arranged, upon closure, to energize an associated solenoid placed in such relation to the memory belt as to actuate a member thereof that is representative of the weight range termed "Small." Thus, as heavier eggs are placed upon the platform and said platform sinks, therefore, to consecutively lower levels, consecutively lower discs are moved into operative positions opposite their switch actuating fingers, and as their respective switches 444j to 444o are individually closed, upon relative approach of all the discs and all the switches, corresponding solenoids are individually energized that activate members of the memory belt which represent consecutively heavier weight ranges, with the uppermost disc 468j in the upper stagger of discs arranged to engage the sensing nose of the left-most actuating finger when depressed to the level of the sensing noses by an egg of maximum size. The switch 444j that may be closed by said left-most sensing finger is arranged upon closure to energize a solenoid 445j which activates upon energization a member on the memory belt that represents eggs of "Jumbo" size, as will be explained in greater detail hereinafter.

As the transfer arms 396a and 396b rise past the receiving end of the scale platform 336 (FIG. 26), the digits 442 of the transfer arms slide between the digits 440 of the scale platform. As each transfer arm reaches the scale platform, it engages the lower portion of the egg disposed on the weighing platform. The transfer arm then assumes a horizontal path, and sweeps the egg laterally across the weighing platform 346 and onto, and across a transfer bridge 550. At the end of the transfer stroke, the egg is gently pushed from the bridge plate 550 into one of the transfer cups 552 (FIGS. 7 and 26), of the lowering conveyor 182. The lowering conveyor lowers the eggs from the level of the transfer bridge 550, to the level of the distribution conveyor 185, and as seen in FIGURE 7, the lowering conveyor deposits the egg into an aligned bucket 186 of the distributing conveyor.

As seen in FIGURES 11, 14 and 26, the transfer bridge 550 has a horizontal plate portion 554 that is supported at its inner end from the stationary segment 404 (FIG. 14) of the chain tension structure 402. The bridge 550 is mounted somewhat below the level of the weighing platform 346, when the latter is in an uppermost position, as indicated in FIGURE 26. The bridge plate 554 is bent downwardly at the inner or delivery edge of the transfer bridge, to present a flat egg-receiving ramp 556 (FIG. 26) facing the weighing platform 346. The ramp 556 prevents contact of the egg with sharp edges, as the egg is swept from the weighing platform 346 and onto the transfer bridge 550 by one of the transfer arms 396a or 396b. This protection against breakage is provided, regardless of the depth to which the egg may have depressed the weighing platform.

The ramp 556 guides the egg smoothly onto the horizontal plate portion 554 of the transfer bridge, in response to the gentle pushing action of the transfer arm 396a, or 396b which is in engagement with the egg. This provides a smooth gentle transfer motion from the weighing platform to the transfer bridge, with the egg resting completely on and supported by the transfer bridge, before it is transferred to the lowering conveyor. The delivery side of the bridge plate 554 is digitated, as seen at 558 (FIGS. 11 and 26), to permit passage of the digitated transfer arms 396a and 396b. With this construction, small eggs cannot be crushed between the transfer arms and the delivery side of the bridge plate, during transfer of the eggs from the bridge plate to the lowering conveyor.

The cups 552 of the egg lowering mechanism 182 have the general shape of a gardener's trowel that has been divided into two segments 552a and 552b of different widths, by a longitudinally extending recess, as best shown in FIG. 26, with the smaller segment 552b located on the side of the weighing mechanism. In the embodiment of the invention illustrated in the accompanying drawings, the mechanism 182 comprises two such trowel-shaped cups 552, separately identified by the reference numerals 552' and 552", which are both supported for rotation about a horizontal axis from a position wherein the cups are located adjacent the transfer bridge 550 to a position wherein they are located above and point into an aligned bucket 186 of the distributing conveyor 185 underneath (FIG. 25). For this purpose both the cups 552 are secured to short arms 562 that are rotatably mounted upon a common horizontal shaft 564 which projects laterally from the center point of a base plate 566 that has somewhat the shape of a double-edged ax blade, as best shown in FIGURES 7 and 26. Said base plate 566 is secured diametrically across a sprocket 568 which is firmly mounted upon a horizontally positioned tubular shaft 570 (FIG. 26) and which meshes with the upper run 572 of one of the two endless sprocket chains 574a and 574b of the distributing conveyor 185. The tubular shaft 570 of the sprocket turns on a pair of ball bearings 576a and 576b that are interposed between the cylindrical inner surface of said shaft 570 and the outer surface of a stationary shaft 578 which may likewise be of tubular construction and which is adjustably held in the side wall 580 of a cabinet 582 that covers a clutch 584 through which the hereinbefore described elevator 168 is operatively connected to the sprocket 568 and hence to the distributing conveyor 185 by which said sprocket is driven.

The egg lowering conveyor mechanism 182 and the distributing conveyor 185 must operate in synchronism so that a transfer cup moving into its discharge position will always find an aligned bucket in the distributing conveyor underneath, and as pointed out hereinbefore, the drive sprocket 568 of the described transfer mechanism is, therefore, driven directly from the distributing conveyor by being in mesh with the upper run of one of the sprocket chains of said conveyor as illustrated in FIGS. 25 and 26. A complete description of the construction and operation of these mechanisms is contained in the above-mentioned Mumma parent application.

As pointed out hereinbefore, the tubular shaft 570 of the sprocket 568 is employed to drive the feed elevator of the respective candling station and the weighing mechanism associated with said station from, and in properly timed relation with, the distributing conveyor, and for this purpose it carries a ratchet 620 (FIG. 27) that constitutes the driven side of the hereinbefore mentioned clutch 584. Said ratchet has a single tooth 621 that is ordinarily engaged by the hook-shaped head 622 of a pawl 623. Said pawl is pivotally supported from the adjacently positioned radially directed wall 624 of a lip 625 (FIG. 26) which is rigidly secured to a sprocket 626 that is rotatably mounted upon the tubular shaft 570 and constitutes the driven side of the clutch 584. A spring 627 compressed between the rear edge of the pawl head 622 and a horizontal portion 628 of the lip 625 that extends over the pawl, urges said pawl into the defined position of engagement with the single tooth 621 of the ratchet 620, as illustrated in FIG. 27, wherein the rotary power of the tubular shaft 570 is transmitted to the sprocket 626.

The sprocket 626 in turn is operatively connected by means of a sprocket chain 630 with another sprocket 631 that is firmly mounted upon a counter shaft 632 disposed below the tubular shaft 570 of the sprocket 568, as best shown in FIG. 28. Said last-mentioned shaft 632 is rotatably supported in the clutch cabinet 582 and the cabinet 216 of the weighing mechanism 180 and carries at a point beyond the outer wall of said last-mentioned cabinet 216 a sprocket 633 that is operatively connected by means of an endless sprocket chain 634 with a sprocket 635 which is firmly mounted upon the hereinbefore mentioned drive shaft 218 of the elevator 168. Likewise supported from the counter shaft 632 at a point below the weighing mechanism is a bevel gear 636 that meshes with another bevel gear 637 which is rotatably supported from the walls of the cabinet 216. Pinned to said bevel gear 637 is a sprocket 638 (FIG. 29) that is operatively connected by means of another endless sprocket chain 640 (FIG. 28) with a sprocket 641 which is firmly mounted upon the hereinbefore mentioned drive hub 408 that carries the control cam 487 which effects the relative approach of the weight switch supporting frame 450 and the weight disc supporting bracket structure 350. Thus, whenever the clutch 584 is engaged, the feed elevator and the weighing mechanism of the particular candling station will operate in properly timed relation with each other and with the distributing conveyor.

To effect disengagement of the clutch 584 and in this manner bring the feed elevator and the weighing mechanism of a particular candling station to a standstill while the distributing conveyor may continue to operate, the tail end 642 of the pawl 623 carries a camming arc 644 that swings with the pawl about the axis of the tubular shaft 570 as long as the head 622 of the pawl engages the single tooth 621 of the drive ratchet 620 under the urgency of spring means 627. A means is provided, however, that may be operated to urge the camming arc 644 in radial direction toward the center of rotation of the tubular drive shaft 570 causing the pawl head 622 to disengage, and remain disengaged, from the solitary tooth 621 of the ratchet 620 so that the drive connection between the tubular shaft 578 and the sprocket 626 is interrupted. For this purpose a one-armed actuating lever 645 is pivotally supported from one of the walls of the clutch cabinet 582, as shown at 646 in FIG. 25 and lies normally below the circular orbit of the camming arc 644, as shown in FIG. 45. When said lever 645 is raised, however, into the position where it intersects the rotary orbit of the pawl tail 642, the caming arc 644 on said tail will strike against the upper edge of the lever 645 causing the pawl 623 to swing in counterclockwise direction about its pivot which disengages its head 622 from the tooth 621 of the ratchet 620. As a result thereof, the driving connection between the tubular shaft 570 and the sprocket 626 is interrupted and the latter will cease to turn, causing the feed elevator and the weighing mechanism to cease operation.

*Distributing conveyor*

The distributor conveyor 185 comprises a pair of parallel, transversely spaced endless chains 574a that are trained at the trailing end of the conveyor upon a pair of idler sprockets 651a and 651b, respectively, which are mounted upon a common transverse shaft 652 that is rotatably supported from the machine frame adjacent the cabinet 172 of the hereinbefore mentioned memory belt 170 (FIG. 4A). An initial horizontal portion of the upper run 653 of the distributing conveyor passes adjacent the cabinets 216 of the six hereinbefore described weighing mechanisms 180 comprised in the machine, with one of its chains enmeshed with the drive sprockets 568 of the mechanisms 182 that are associated with the weighing mechanisms 180 as described hereinbefore. Beyond the last of the weighing mechanisms the chains of the distributing conveyor pass, and are turned downwardly over a pair of idler sprockets 654a and 654b to form a short descending run 655. The lower end of said descending run is determined by another pair of idler sprockets 656a and 656b whose bottom segments engage the sprocket chains from above. Beyond said last-mentioned pair of sprockets, the upper run of the distributing conveyor reverts to horizontal disposition and passes over the carton supply conveyors 192 of the eighteen juxtaposed packing stations 190. Beyond the last of the packing stations both chains are trained downwardly over a pair of drive sprockets 657a and 657b that are mounted upon a common drive shaft 658 which is rotatably supported in the machine frame. Said shaft 658 is driven from an electric motor 659, disposed below the conveyor chains, by means of an endless sprocket chain 660 that transmits the rotary power of the motor to a sprocket 662 which is firmly mounted upon the shaft 658. Below the drive sprockets 657a and 657b the chains of the distributing conveyor are trained about another pair of idler sprockets 663a and 663b, and after forming a horizontal run 664, they rise from below another pair of idler sprockets 665a and 665b to the level of the bottom segments of the initially mentioned idler sprockets 651a and 651b at the trailing end of the conveyor reverting to horizontal disposition over yet another set of idler sprockets 666a and 666b that maintains them at the defined level for operational engagement with the lower segments of said idler sprockets 651a and 651b. It will therefore be seen that the motor 659 drives the conveyor 185 which in turn drives the feed elevator and the weighing mechanism in timed relation.

From the foregoing description it will be recognized that the present invention provides a particularly effective transfer mechanism for moving an egg from one conveyor over a weighing mechanism and onto a second conveyor, and an efficient scale mechanism. The concave configuration of the lower end of each disc 468 of the scale and the concave upper edge 503 of each nose 482 provides a unique safety mechanism in a scale. Also, the arrangement, whereby all the discs are lowered to the position of FIG. 22, is particularly effective in making certain that each disc 468 will accurately engage the associated nose 482.

While I have described by invention with the air of a particular embodiment thereof, it will be understood that I do not wish to be limited to the specific constructional details illustrated and described which may be departed from without departing from the spirit of the invention.

Also while the machine of the invention as illustrated in the accompanying drawings and as described in the specification was specifically devised, and is employed for processing eggs, it will be understood that a machine embodying the principles of the invention may also be usefully employed to segregate other articles, such as avocadoes, lemons, or other highly priced fruit.

I claim:

1. A weighing mechanism especially for eggs comprising a platform, means resiliently maintaining said platform in an elevated position in a manner permitting it to yield to lower levels, a plurality of switch actuating discs positioned at different relative levels and mounted for movement in unison with said platform, said discs having concave lower surfaces, an equal number of normally open switches adapted upon closure to activate different weight indicating elements and having operating arms opposite said discs, actuating fingers rotatably mounted intermediately of said discs and said arms, actuating noses formed on a common horizontal level upon the edges of said fingers confronting said discs, said noses having concave upper edges, means for delivering an egg onto said platform, and means operable upon deposit of an egg onto said platform to relatively approach said discs and said switches so as to cause contact of one of said noses by its corresponding disc, and consequent actuation of the respective switch arm by the opposite edge of the finger mounting the contacted nose.

2. A weighing mechanism especially for eggs comprising a platform, means resiliently maintaining said platform in an elevated position in a manner permitting it to yield to lower levels, a plurality of switch actuating discs positioned at different relative levels and mounted for movement in unison with said platform, said discs having concave lower surfaces, an equal number of normally open switches adapted upon closure to activate different weight indicating elements and having operating arms opposite said discs, actuating fingers rotatably mounted intermediately of said discs and said arms, actuating noses formed on a common horizontal level upon the edges of said fingers confronting said discs, said noses having concave upper edges, means for delivering an egg onto said platform, means operable upon deposit of an egg onto said platform to relatively approach said discs and said switches so as to cause contact of one of said noses by its corresponding disc, depending upon the level to which an egg deposited onto said platform depressed said platform, and consequent actuation of the respective switch arm by the opposite edge of the finger mounting the contacted nose, and means operably coincident with an initial phase of the relative approach of said discs and said switches to depress said discs a limited distance below the level determined by deposit of the egg onto said platform.

3. A weighing mechanism especially for eggs comprising a platform, means resiliently maintaining said platform in an elevated position in a manner permitting it to yield to lower levels, a plurality of switch actuating discs positioned at different relative levels and mounted for movement in unison with said platform, said discs having concave lower surfaces, an equal number of normally open switches adapted upon closure to activate different weight indicating elements and having operating arms opposite said discs, actuating fingers rotatably mounted intermediately of said discs and said arms, actuating noses formed on a common horizontal level upon the edges of said fingers confronting said discs, said noses having concave upper edges, means for delivering an egg onto said platform, means operable upon deposit of an egg onto said platform to relatively approach said discs and said switches so as to cause contact of one of said noses by its corresponding disc, and consequent actuation of the respective switch arm by the opposite edge of the finger mounting the contacted nose, and means operable coincident with the relative approach of said discs and said switches to depress said discs a limited distance below the level determined by deposit of the egg onto said platform and to then lock said discs in said depressed position.

4. A combined weighing and weight recording mechanism for eggs comprising a platform adapted to support an egg, means for resiliently retaining said platform in an elevated position in a manner permitting it to yield to lower levels, said last mentioned means including temperature-sensitive compensating elements, cyclically operable means for delivering an egg into and out of said platform, a plurality of switch actuating discs positioned at different relative levels and mounted for movement in unison on said platform, an equal number of solenoids arranged upon energization to register different consecutive weight ranges upon a weight recording instrument, an equal number of normally open switches in series with individual ones of said solenoids and having operating arms opposite said discs, actuating fingers rotatably mounted intermediately of said discs and said arms, contact noses framed upon the edges of said fingers facing said discs on a common horizontal level, said discs having concave bottom surfaces and said noses having concave top edges, means operating in timed relation wtih said egg delivering means and effective upon deposit of an egg onto said platform to relatively approach said discs and said switches so as to cause engagement of one of said noses by its corresponding disc, depending upon the level to which an egg deposited on said platform depressed said platform, and consequent actuation of one of said switch arms by the opposite edge of the finger mounting the engaged nose, and means operably concident with the relative approach of said discs and said switches to depress said discs a limited distance below the level determined by the weight of the egg placed on said platform and then to lock said platform temporarily in depressed position.

5. A weighing mechanism especially for eggs comprising a platform, means resiliently maintaining said platform in an elevated position in a manner permitting it to yield to lower levels, a plurality of switch actuating discs positioned at different relative levels and mounted for movement in unison with said platform, an equal number of normally open switches adapted upon closure to activate different weight indicating elements and having operating arms opposite said discs, switch actuating fingers rotatably mounted between said discs and said arms, actuating noses formed on a common horizontal level upon the edges of said fingers confronting said discs, means for delivering an egg onto said platform, means operable upon deposit of an egg onto said platform to cause relative motion between said discs and said switches so as to cause contact of one of said noses by its corresponding disc, depending upon the level to which an egg deposited onto said platform depressed said platform, and consequent actuation of the respective switch arm by the opposite edge of the finger mounting the contacted nose, and means operable coincident with an initial phase of the relative approach of said discs and said switches to depress said discs a limited distance below the level determined by deposit of the egg onto said platform.

6. A weighing mechanism especially for eggs comprising a platform, means resiliently maintaining said platform in an elevated position in a manner permitting it to yield to lower levels, a plurality of switch actuating discs positioned at different relative levels and mounted for movement in unison with said platform, an equal number of normally open switches adapted upon closure to activate different weight indicating elements and having operating arms opposite said discs, switch actuating fingers rotatably mounted intermediately of said discs and said arms, actuating noses formed on a common horizontal level upon the edges of said fingers confronting said discs, means for delivering an egg onto said platform, means operable upon deposit of an egg onto said platform to cause relative motion between said discs and said switches so as to cause contact of one of said noses by its corresponding disc, and consequent actuation of the respective switch arm by the opposite edge of the finger mounting the contacted nose, and means operable coincident with the relative approach of said discs and said switches to depress said discs a limited distance below the level determined by deposit of the egg onto said platform and to then lock said discs in said depressed position.

7. A combined weighing and weight recording mechanism for eggs comprising a platform adapted to support an egg, means for resiliently retaining said platform in an elevated position in a manner permitting it to yield to lower levels, said last mentioned means including temperature-sensitive compensating elements, cyclically operable means for delivering an egg onto and off said platform, a plurality of switch actuating discs positioned at different relative levels and mounted for movement in unison on said platform, an equal number of solenoids arranged upon energization to register different consecutive weight ranges upon a weight recording instrument, an equal number of normally open switches in series with individual ones of said solenoids and having operating arms opposite said discs, actuating fingers rotatably mounted intermediately of said discs and said arms, contact noses framed upon the edges of said fingers facing said discs on a common horizontal level, means operating in timed relation with said egg delivering means and effective upon deposit of an egg onto said platform to cause relative motion between said discs and said switches so as to cause engagement of one of said noses by its corresponding disc, depending upon the level to which an egg deposited on said platform depressed said platform, and consequent actuation of one of said switch arms by the opposite edge of the finger mounting the engaged nose, and means operable coincident with the relative approach of said discs and said switches to depress said discs a limited distance below the level determined by the weight of the egg placed on said platform and then to lock said platform temporarily in depressed position.

References Cited

UNITED STATES PATENTS

| | | | |
|---|---|---|---|
| 1,424,354 | 8/1922 | Hopgood | 177—226 |
| 1,446,963 | 2/1923 | Crane. | |
| 2,116,086 | 5/1938 | Van Berkel. | |
| 2,796,256 | 6/1957 | Stelzer | 177—226 |

RICHARD B. WILKINSON, *Primary Examiner.*

LEO SMILOW, *Examiner.*

UNITED STATES PATENT OFFICE
CERTIFICATE OF CORRECTION

Patent No. 3,351,145

November 7, 1967

Harold J. Mumma

It is certified that error appears in the above identified patent and that said Letters Patent are hereby corrected as shown below:

Column 5, line 22, "nad" should read -- and --. Column 13, line 65, "distributor" should read -- distributing --. Column 14, line 46, after "associated" insert -- sensing --; line 47, "air" should read -- aid --.

Signed and sealed this 16th day of September 1969.

(SEAL)
Attest:

Edward M. Fletcher, Jr.
Attesting Officer

WILLIAM E. SCHUYLER, JR.
Commissioner of Patents